(12) United States Patent
Kaplin

(10) Patent No.: US 8,283,066 B2
(45) Date of Patent: Oct. 9, 2012

(54) ELECTROCHEMICAL CELL WITH IMPROVED INTERNAL CONTACT

(75) Inventor: David Aaron Kaplin, Mayfield Heights, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 562 days.

(21) Appl. No.: 12/571,848

(22) Filed: Oct. 1, 2009

(65) Prior Publication Data

US 2010/0068619 A1    Mar. 18, 2010

Related U.S. Application Data

(63) Continuation of application No. 11/903,491, filed on Sep. 21, 2007, now abandoned, and a continuation-in-part of application No. 11/045,900, filed on Jan. 28, 2005, now Pat. No. 7,618,742.

(51) Int. Cl.
     *H01M 2/26* (2006.01)
     *H01M 4/13* (2010.01)

(52) U.S. Cl. .................................. 429/161; 429/231.95

(58) Field of Classification Search .................... 429/161
See application file for complete search history.

(56) References Cited

U.S. PATENT DOCUMENTS

| | | | |
|---|---|---|---|
| 3,245,837 A | 4/1966 | Ikeda et al. | |
| 4,454,208 A | 6/1984 | Osmialowski | |
| 4,554,227 A | 11/1985 | Takagaki et al. | |
| 4,707,421 A | 11/1987 | McVeigh, Jr. et al. | |
| 4,963,445 A | 10/1990 | Marple et al. | |
| 4,963,446 A | 10/1990 | Roels et al. | |
| 5,021,306 A | 6/1991 | Sauer et al. | |
| 5,290,414 A | 3/1994 | Marple | |
| 5,368,958 A | 11/1994 | Hirai et al. | |
| 5,418,084 A | 5/1995 | Georgopoulos | |
| 5,580,679 A | 12/1996 | Tanaka | |
| 5,925,482 A | 7/1999 | Yamashita | |
| 6,045,946 A | 4/2000 | Maggert et al. | |
| 6,106,975 A | 8/2000 | Watanabe et al. | |
| 6,117,589 A | 9/2000 | Satou et al. | |
| 6,190,794 B1 | 2/2001 | Wyser | |
| 6,328,769 B1 | 12/2001 | Oweis et al. | |
| 6,387,562 B1 | 5/2002 | Akahira | |
| 6,447,950 B1 | 9/2002 | Iijima | |
| 6,451,473 B1 | 9/2002 | Saito et al. | |
| 6,902,844 B2 | 6/2005 | Yageta et al. | |
| 7,000,297 B2 | 2/2006 | Frustaci et al. | |
| 7,147,971 B2 | 12/2006 | Okamoto et al. | |
| 7,157,185 B2 | 1/2007 | Marple | |
| 2002/0094478 A1 | 7/2002 | Holland | |
| 2003/0072993 A1* | 4/2003 | Kim et al. | 429/94 |

(Continued)

FOREIGN PATENT DOCUMENTS

EP      0422966 A      4/1991

(Continued)

*Primary Examiner* — Patrick Joseph Ryan
*Assistant Examiner* — Muhammad Siddiquee
(74) *Attorney, Agent, or Firm* — Robert C. Baraona

(57) ABSTRACT

Electrochemical battery cells with strip-like electrodes and having a pressure contact between a lead from one of the electrodes and a sidewall of the cell container. An electrochemical cell having a spiral wound electrode assembly having an internal lead in direct pressure contact with a lithium foil negative electrode free of a separate current collector and in contact with an inner portion of the cell container, wherein specified contact between the lead and lithium foil provides current flow between the container and foil.

16 Claims, 11 Drawing Sheets

U.S. PATENT DOCUMENTS

| | | |
|---|---|---|
| 2003/0194608 A1 | 10/2003 | Hirai et al. |
| 2003/0228518 A1 | 12/2003 | Marple |
| 2004/0185332 A1 | 9/2004 | Botos |
| 2004/0197647 A1 | 10/2004 | Murashige et al. |
| 2004/0224225 A1 | 11/2004 | Yamashita et al. |
| 2005/0112462 A1* | 5/2005 | Marple .................. 429/209 |
| 2005/0130044 A1 | 6/2005 | Aoshima et al. |
| 2005/0238956 A1 | 10/2005 | Lee |
| 2005/0246887 A1 | 11/2005 | Yashiro et al. |
| 2006/0073382 A1 | 4/2006 | Urano et al. |
| 2006/0073389 A1 | 4/2006 | Sudou et al. |
| 2006/0121354 A1 | 6/2006 | Frysz et al. |
| 2006/0147792 A1 | 7/2006 | Nelson et al. |
| 2006/0172190 A1* | 8/2006 | Kaplin et al. ............. 429/161 |
| 2007/0072062 A1* | 3/2007 | Fukui et al. .............. 429/94 |

FOREIGN PATENT DOCUMENTS

| | | |
|---|---|---|
| EP | 0569035 A | 11/1993 |
| EP | 1139463 A | 10/2001 |
| JP | 58-119154 A | 7/1983 |
| JP | 02-256158 A | 10/1990 |
| JP | 05-121064 A | 5/1993 |
| JP | 05-166539 A | 7/1993 |
| JP | 09-035739 A | 2/1997 |
| JP | 09-330697 A | 12/1997 |
| JP | 10-308206 A | 11/1998 |
| JP | 2001-176491 A | 6/2001 |
| JP | 02-289167 A | 10/2002 |
| JP | 2004259547 A | 9/2004 |

* cited by examiner

ELECTROCHEMICAL CELL WITH IMPROVED INTERNAL CONTACT

The following patent application is a continuation of co-pending U.S. patent application Ser. No. 11/903,491, filed on Sep. 21, 2007 and published as United States Patent Publication US-2009-0081532-A1, and a continuation-in-part of co-pending U.S. patent application Ser. No. 11/045,900, filed on Jan. 28, 2005 and published as United States Patent Publication US-2007-0172190-A1. In addition to making this reference for the purpose of claiming priority under 35 USC §120 and 121, both of these publications are fully incorporated by reference herein.

FIELD OF THE INVENTION

This invention relates to electrochemical battery cells with strip-like electrodes and having a pressure contact between a lead from one of the electrodes and a sidewall of the cell container. In a further embodiment, the present invention relates to an electrochemical cell having a spiral wound electrode assembly having an internal lead in direct pressure contact with a lithium foil negative electrode free of a separate current collector and in contact with an inner portion of the cell container, wherein specified contact between the lead and lithium foil provides current flow between the container and foil.

BACKGROUND OF THE INVENTION

Cells with adjacent positive and negative electrode strips can be used to provide good high rate discharge performance. Electrode assemblies containing such strips can include one or more pairs of flat, folded or spirally wound positive and negative electrodes. Cells can have housings including containers made from electrically conductive metals that are in electrical contact with one of the electrodes. In such cells the cell container can serve as or provide electrical contact to an external contact terminal.

Electrically conductive leads can be used for making electrical contact between electrodes and another cell component, such as the container or a cover closing a portion of the container. Leads can be in various forms and shapes, such as wires, strips and springs, and leads can be connected to containers or covers in various ways, including by fastening (e.g., welding) and by pressure.

U.S. Patent Application Publication Nos. 2004/0185332, 2005/0238956 and 2006/0147792 relate to electrochemical cells having various configurations for connecting a lead to a negative electrode.

Examples of cells in which an electrode lead is welded to an exposed edge or surface of an electrode current collector are found in U.S. Pat. No. 4,554,227, which is hereby incorporated by reference, and in unexamined Japanese patent publication numbers 05-121064 and 09-035739. In each of these the leads are electrically connected to external terminals by welding. In U.S. Pat. No. 4,554,227 the lead is bent to improve the strength of the welds to the exposed top edge of the electrode current collector.

Examples of cells in which pressure contact is used between a lead and an exposed portion of an electrode current collector at the core of the electrode assembly are found in U.S. Pat. Nos. 3,245,837 and 5,021,306, which are hereby incorporated by reference. In U.S. Pat. No. 3,245,837 the lead is an electrically conductive strip that is fastened to a cover plate and external terminal. In U.S. Pat. No. 5,021,306 the lead is a metal splint, and a leaf spring welded to the cap on the open end of the container makes pressure contact with the splint.

An example of a cell with leads that are bare portions of current collectors protruding from a plurality of electrodes is found in U.S. Patent Publication No. U.S. 2002/0094478 A1, which is hereby incorporated by reference. The plurality of leads is bent and welded together, then fastened to a cell cover. The bends in the leads provide good weld strength.

An example of a cell with a lead extending from the bottom of an electrode assembly and welded to the bottom of the container is found in unexamined Japanese patent publication number 09-330697. A V-shaped groove is formed in a portion of the lead welded to the container to provide good weld strength.

Examples of cells with leads providing electrical contact between one electrode and the cell container and between the other electrode and a cover closing the container are found in U.S. Pat. Nos. 5,418,084 and 4,963,446, which are hereby incorporated by reference, as well as in FIGS. 1 and 2 herein. The cells are cylindrical cells with spirally wound electrode assemblies. As described in further detail below with reference to FIGS. 1 and 2, in each cell a spring provides electrical contact between the positive electrode and the cell cover, and a metal strip lead provides electrical contact between the negative electrode and the sidewall of the container. The spring is fastened to the cell cover and makes pressure contact with the positive electrode current collector exposed at the top of the electrode assembly. The metal strip lead is fastened to the negative electrode and makes pressure contact with the inside surface of the container sidewall. A reliable pressure contact is needed between the lead and the container under normal ranges of variability in manufacturing.

In a cell such as the cell in FIGS. 1 and 2, when made according to the prior art, the lead between the container sidewall and the electrode assembly is held in pressure contact by a tight fit of the electrode assembly in the container. For reliable electrical contact, variability in the inside diameter of the container and the outside diameter of the electrode assembly must be small. One way is to vary the length of a strip of material that is wrapped around the external side surface of the electrode assembly to compensate for variations in thicknesses of the electrodes that can result in differences in diameter. This outer strip of material can be one or more strips of separator or a separate strip of overwrap material, as disclosed in U.S. Pat. No. 4,963,445, which is hereby incorporated by reference.

Metallic lithium and lithium alloys are used as negative electrode active materials in various cell constructions and the lithium is consumed via reaction during cell discharge. In order to maintain conductivity of the negative electrode throughout discharge, various solutions have been presented, including utilizing a higher interfacial theoretical input capacity ratio of the anode to the cathode (A/C), i.e., an overbalance of lithium, theoretical capacity; and utilizing a current collector. Many different types and styles of current collectors have been utilized, see for example U.S. Pat. No. 5,368,958 which discloses a sandwich construction of a lithium sheet, a conductive foil and a second lithium sheet, with the conductive foil positioned between the first and second lithium sheets. Significantly, because the lithium anode is consumed during discharge, having an underbalance of lithium means that the anode may suffer disconnects if there are any dissimilarities in the electrodes. These disconnects prevent transport of electrons across the anode to the appropriate current collector, hence the reason many prior art solutions require collectors to span the length and/or width of the anode.

Current collectors or leads for lithium or lithium alloy negative electrodes have been disclosed that extend lengthwise or widthwise in relation to a strip-like negative electrode that can be folded or rolled into a jellyroll form, for example. U.S. Patent Application Publication No. 2005/0238956 and U.S. Patent Application Publication No. 2006/0172190, both herein fully incorporated by reference, disclose a negative electrode lead extending widthwise, i.e., axially, across a portion of a spirally wound negative electrode about 90% of the width or the axial height of the electrode and positioned near the outer circumference of the wound electrode assembly.

SUMMARY OF THE INVENTION

An object of the present invention is to provide reliable pressure contact between an electrode lead and the sidewall of the cell container. Additional advantages of the invention can include, but are not limited to, improved contact reliability, increased tolerance of variability in manufacturing, reduced number of cell components, improved ease of manufacturing, reduced manufacturing scrap and reduced product cost.

Another object of the invention is to provide an electrochemical cell including a negative electrode consisting of lithium or a lithium alloy that unexpectedly can be provided with a lead for electrically connecting the electrode to a conductive component of a container of the cell wherein the need for substantial lengthwise or widthwise current collecting contact has been dispensed with.

A further object of the present invention is to provide an electrochemical cell having a lithium negative electrode free of a separate current collector and a lead having a relatively short length connected directly to the lithium electrode and to a portion of the cell container thereby providing the cell with an increased internal area, preferably available for active materials.

Yet another object is to provide a negative electrode lead having a relatively small contact area with the lithium foil electrode, such as embodied by reduced lead length or distance in contact with a width of the electrode, without substantially impacting cell service.

Still another object is to provide a negative electrode lead connected to a lithium foil electrode of a primary cell having a design that prevents lithium from being isolated from the lead during discharge which can prevent consumption of the lithium and reduce cell service life.

Yet another object of the present invention is to provide an electrochemical cell, including an electrode assembly, that has an interfacial, theoretical anode to cathode input capacity ratio that is less than 1.0 (A/C<1), and wherein the negative electrode lead has a relatively small area in contact with a negative electrode that consists of lithium or a lithium alloy and is free of a separate current collector.

Still another object of the invention is to provide an electrochemical cell that is anode deficient and that has an interfacial, theoretical anode to cathode input capacity ratio of less than 1.0, wherein substantially all interfacially oriented negative electrode active material is consumed without substantial loss of performance, even when utilizing a negative electrode lead having relatively little area in contact with the negative electrode that is free of a current collector.

Another aspect of the present invention is directed to an electrochemical cell, comprising a substantially cylindrical, conductive container having a closed end, an open end sealed by an end assembly, and a sidewall extending between the closed end and the open end, a positive electrode comprising iron disulfide, a negative electrode consisting essentially of lithium or a lithium alloy having at least 90 wt. % lithium and having a cumulative surface area, a separator, a nonaqueous, organic electrolyte, an internal lead located in the container and in electrical contact with the negative electrode, wherein the lead has a surface area that is connected to less than 0.7% of the cumulative surface area of the negative electrode, and wherein the positive electrode, the negative electrode and the separator are wound into a jellyroll electrode assembly so that the internal lead makes electrical contact with the container or the end assembly, and wherein a theoretical, interfacial anode-to-cathode input capacity ratio for the cell is less than 1.0.

A further aspect of the present invention is directed to an electrochemical cell, comprising a substantially cylindrical, conductive container having a closed end, an open end sealed by an end assembly, and a sidewall extending between the closed end and the open end, a spiral wound electrode assembly disposed within the container and including a negative electrode, positive electrode, an organic nonaqueous electrolyte, and a polymeric separator disposed between the negative electrode and positive electrode, wherein the negative electrode consists essentially of one or more layers of lithium or a lithium alloy having a length and a width, and wherein the negative electrode is free of a separate current collector, and an internal lead located in the container and electrically connecting the negative electrode to the container, wherein one end portion of the lead is directly connected to the one or more layers of lithium or lithium alloy, and wherein the lead extends a distance measured from one width end of the negative electrode from 10% to less than 88% of the width of the lithium or lithium alloy layer measured parallel to a longitudinal axis of the cell at a location of connection.

Still a further aspect of the present invention is directed an electrochemical cell, comprising a substantially cylindrical, conductive container having a closed end, an open end sealed by an end assembly, and a sidewall extending between the closed end and the open end, a spiral wound electrode assembly disposed within the container, said spiral wound electrode assembly having a negative electrode strip consisting essentially of lithium or a lithium alloy with a length and a width creating a cumulative surface area, a positive electrode strip, an organic nonaqueous electrolyte, and a separator disposed between the negative and positive electrode strips, an internal lead located in the container and electrically connecting the negative electrode to the container, wherein one end portion of the lead is connected to the lithium or lithium alloy, wherein there is no direct electrical contact between the sidewall of the container and either the negative electrode or the positive electrode, wherein the lead is connected along a bottom portion of the negative electrode and extends outside the electrode assembly to make pressure contact with the sidewall or a bottom wall of the container, and wherein the lead has a surface area that is connected to less than 0.7% of the cumulative surface area of the negative electrode and extends a distance measured from one width end of the negative electrode from 10% to less than 88% of the width of the negative electrode as measured parallel to a longitudinal axis of the cell.

These and other features, advantages and objects of the present invention will be further understood and appreciated by those skilled in the art by reference to the following specification, claims and appended drawings.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
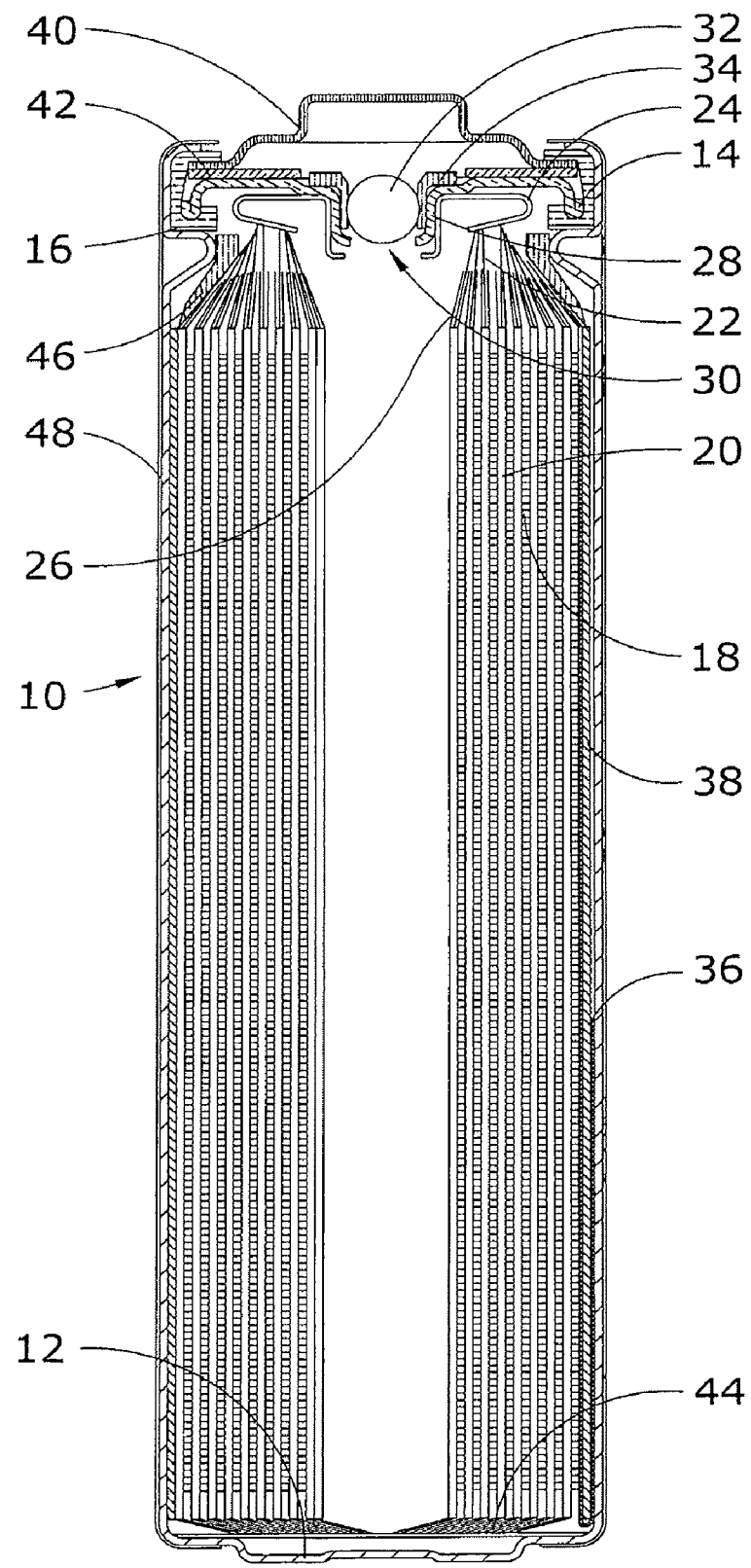
FIG. 1 is a longitudinal cross sectional view of an electrochemical battery cell with a lead disposed between the side of the container wall and the external surface of the container for making electrical contact between the container and a cell electrode.
Figure 2:
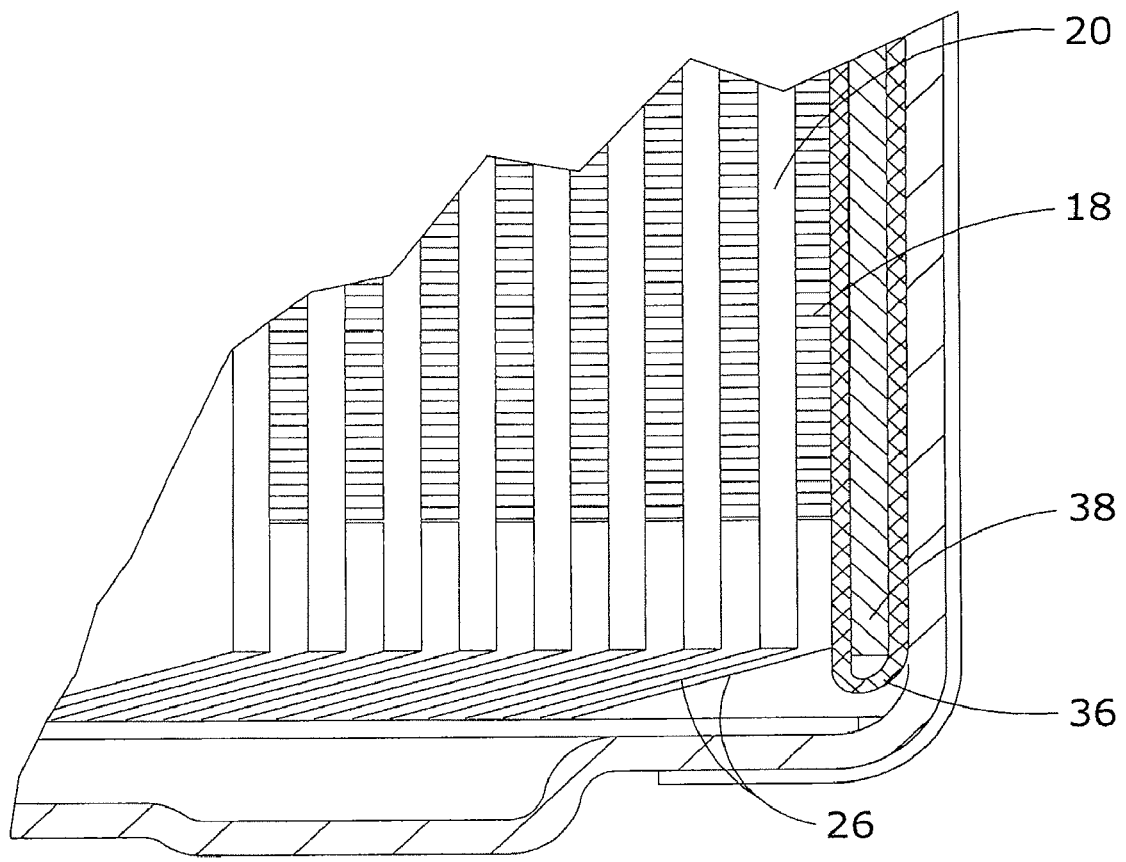
FIG. 2 is an enlarged view of a portion of the cell in FIG. 1 showing the location of the electrode lead contacting the container.

The invention will be better understood with reference to FIGS. 1 and 2. Cell 10 is an FR6 type cylindrical Li/FeS$_2$ battery cell. Cell 10 has a housing that includes a container in the form of a can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode or negative electrode 18, a cathode or positive electrode 20 and electrolyte within the cell 10. The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal lead (or tab) 36 (FIG. 2). The lead 36 is fastened to the anode 18, extends from the bottom of the electrode assembly, is folded across the bottom and up along the side of the electrode assembly. The lead 36 makes pressure contact with the inner surface of the sidewall of the can 12. After the electrode assembly is wound, it can be held together before insertion by tooling in the manufacturing process, or the outer end of material (e.g., separator or polymer film outer wrap 38) can be fastened down, by heat sealing, gluing or taping, for example.

An insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12.

Cell 10 has a separate positive terminal cover 40, which is held in place by the inwardly crimped top edge of the can 12 and the gasket 16 and has one or more vent apertures (not shown). The can 12 serves as the negative contact terminal. An insulating jacket, such as an adhesive label 48, can be applied to the sidewall of the can 12.

Disposed between the peripheral flange of the terminal cover 40 and the cell cover 14 is a positive temperature coefficient (PTC) device 42 that substantially limits the flow of current under abusive electrical conditions. Cell 10 also includes a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, is forced out of the aperture to release pressurized gases from the cell 10. In other embodiments, the pressure relief vent can be an aperture closed by a rupture membrane, such as disclosed in U.S. Patent Application Publication No. 2005/024470, herein fully incorporated by reference, or a relatively thin area such as a coined groove, that can tear or otherwise break, to form a vent aperture in a portion of the cell, such as a sealing plate or container wall.

Figure 3A:
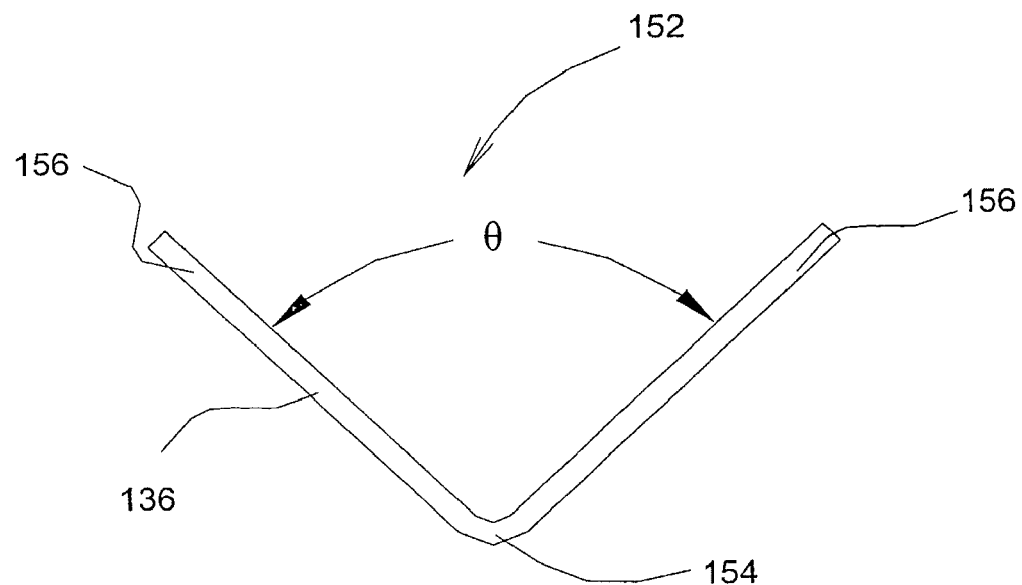
FIG. 3A is a transverse cross sectional view of the terminal portion of an electrode lead with a single V-shaped groove.
Figure 3B:
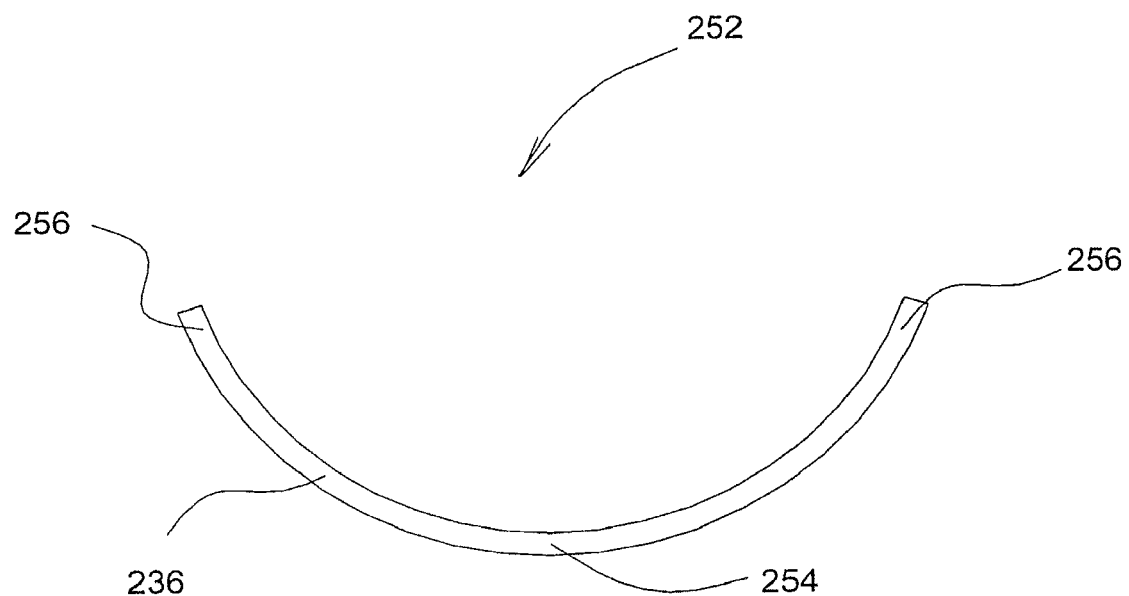
FIG. 3B is a transverse cross sectional view of the terminal portion of an electrode lead with a single arc-shaped groove.

In one embodiment of a cell according to the invention, the terminal portion of the electrode lead, disposed between the side of the electrode assembly and the sidewall of the can, is initially non-planar. As used herein, initially non-planar means non-planar prior to insertion of the electrode assembly into the can. Before electrode assembly insertion, the terminal portion of the lead is formed to create a non-planar shape that can provide improved pressure contact with the sidewall of the can. The non-planar shape can provide a spring-like characteristic in the terminal portion of the lead, resulting in the application of force by the terminal portion of the lead to bias the lead against the can sidewall, thereby providing improved pressure contact for a given gap between the side of the electrode assembly and the sidewall of the can and increasing the maximum possible gap for which good electrical contact can be maintained. A variety of non-planar shapes can be used, including shapes with cross sections having one or more V's, arcs, and the like and combinations thereof. Examples of leads with single V-shaped and arc-shaped grooves are shown in FIGS. 3A and 3B, respectively, in which the groove 152, 252 has a bottom 154, 254 and edges 156, 256 in the terminal portion of the lead 136, 236.

Figure 4A:
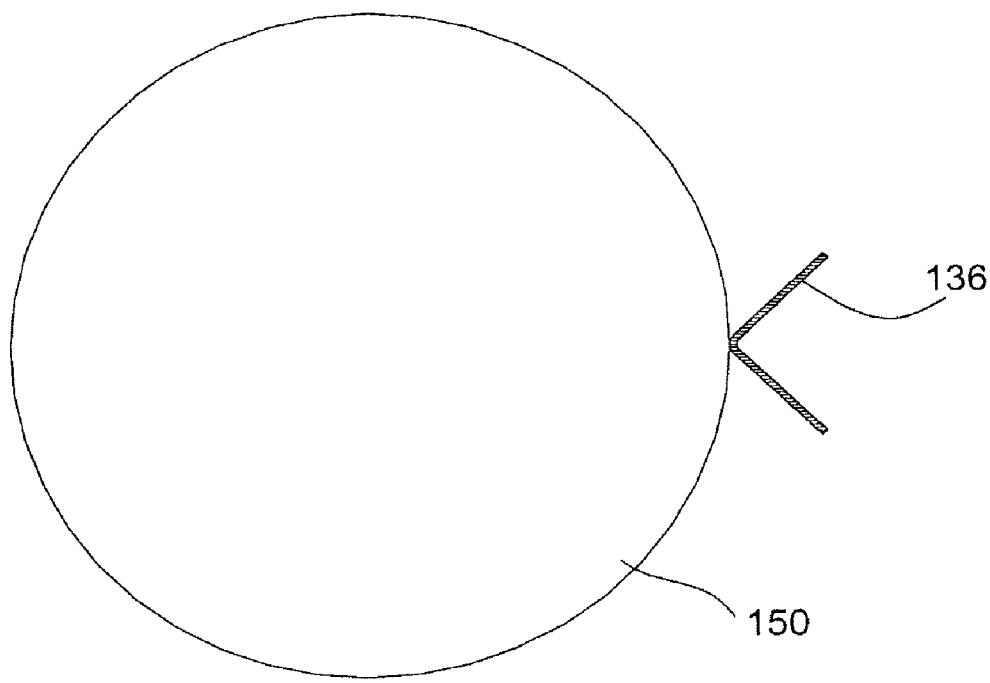
FIG. 4A is a cross sectional view, perpendicular to the longitudinal axis of the electrode assembly, of an electrode assembly with a V-shaped electrode lead.
Figure 4B:
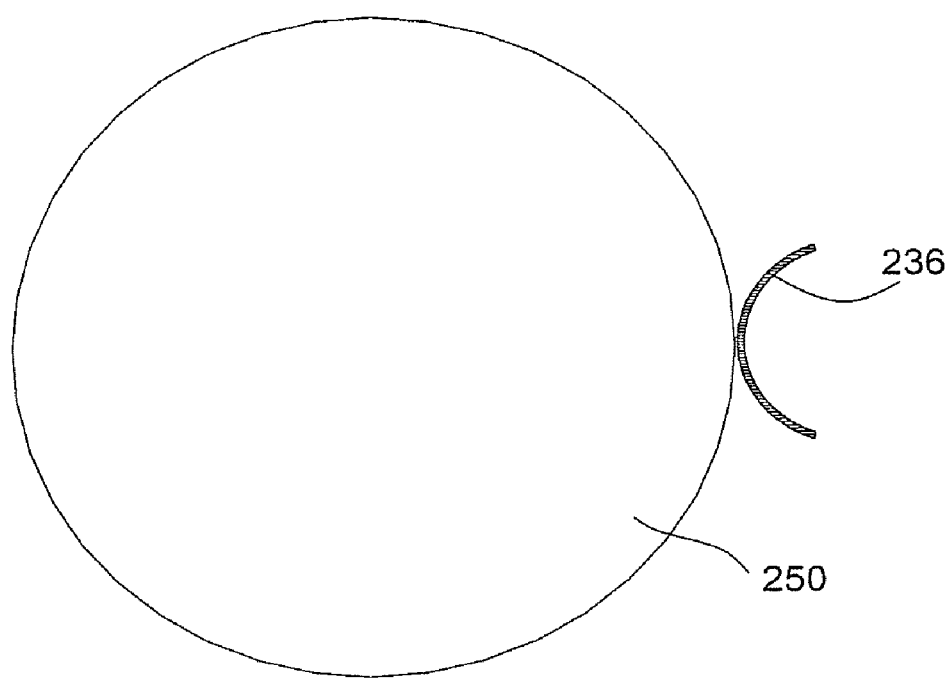
FIG. 4B is a cross sectional view, perpendicular to the longitudinal axis of the electrode assembly, of an electrode assembly with an arc-shaped electrode lead.
Figure 5A:
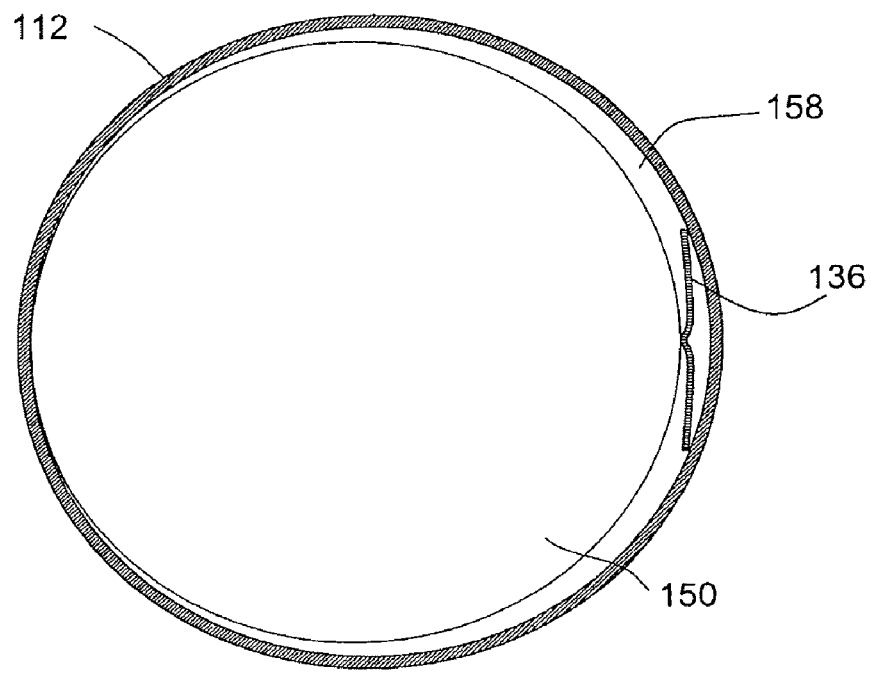
FIG. 5A is a cross sectional view of the electrode assembly and lead in FIG. 4A after the electrode assembly has been inserted into a can.
Figure 5B:
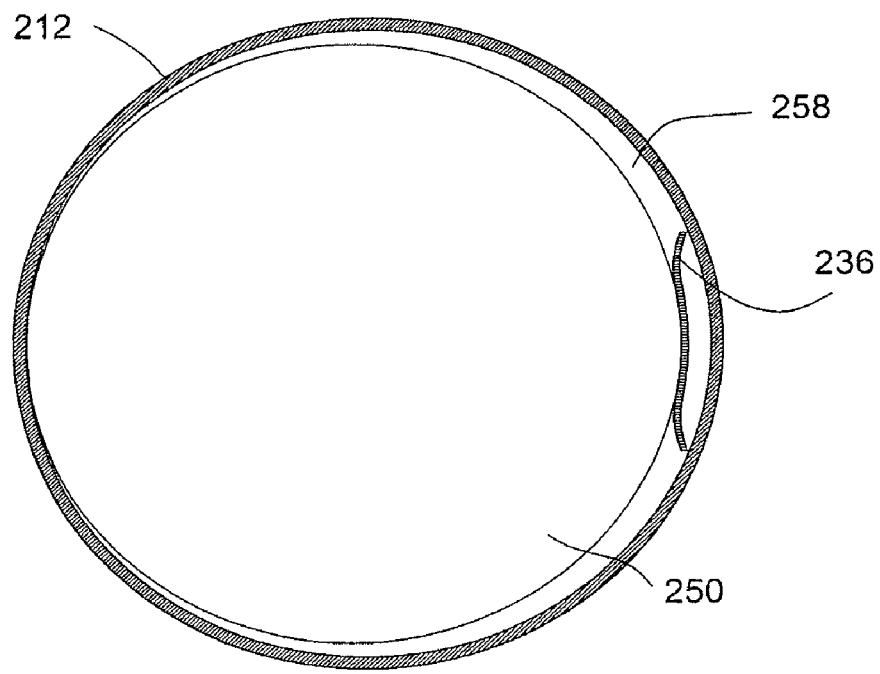
FIG. 5B is a cross sectional view of the electrode assembly and lead in FIG. 4B after the electrode assembly has been inserted into a can.

During cell manufacture, the shaped terminal portion of the lead can be deformed, e.g., toward the side of the electrode assembly, to facilitate its insertion into the can, following which the terminal portion of the lead can spring partially back toward its initially non-planar shape, but remain at least partially compressed to apply a force to the inside surface of the sidewall of the can, thereby making good physical and electrical contact with the can. FIGS. 4A and 4B are cross-sectional shapes of electrode assemblies 150, 250 and the terminal portions of the leads 136, 236 (FIGS. 3A and 3B) after the terminal portions of the leads 136, 236 have been bent into position adjacent to the external side surfaces of the electrode assemblies 150, 250. FIGS. 5A and 5B show the electrode assemblies 150, 250 and terminal portions of the leads 136, 236 after insertion into cans 112, 212. The terminal portions of the leads 136, 236 are partially compressed compared to their pre-insertion shapes so they apply a spring force against the inner surfaces of the cans 112, 212, even if there are gaps 158, 258 between the side surfaces of the electrode assemblies 150, 250 and the sidewalls of the cans 112, 212.

The shape(s) formed in the terminal portion of the lead can be oriented in any way that will allow insertion of the electrode assembly into the can without damaging the electrode assembly, the lead or the can to the point that the cell's electrical or discharge characteristics will be undesirably affected. Orienting the shape in the terminal portion of the lead so that grooves are oriented to be parallel to the longitudinal axis of the electrode assembly can facilitate deformation of the lead prior to insertion into the can and spring-back of the lead after insertion without causing deleterious damage. In addition, by orienting the lead so the edges of the terminal portion of the lead do not point inward toward the electrode assembly, the risk of damage to the electrode assembly can be reduced. For example, a lead with a single groove can be oriented so the bottom of the groove faces inward, toward the electrode assembly, and the edges of the groove point outward, toward the can sidewall.

The maximum gap, or difference between the outside diameter of the electrode assembly and the inside diameter of the can, that can be accommodated without loss of contact between the can and the lead can be calculated for a lead with a single V-shaped groove and for a lead with a single arc-shaped groove extending across the entire width of the lead using Equation 1 and Equation 2, respectively (assuming that the deformed terminal end of the lead would be able to fully spring back to its original shape if unconstrained by the electrode assembly and can).

$$\left(\frac{W}{2}\right)\cdot\sin\left(\frac{180-\theta}{2}\right) + \left(\frac{ID - \sqrt{ID^2 - (W^2/2)\cdot(1-\cos\theta)}}{2}\right) + t, \text{ where:} \quad \text{Equation 1}$$

W=width of the flat strip from which the lead is made, t=lead strip thickness, θ=V leg angle (see FIG. 3A), ID=can inside diameter and 0°≦θ≦180°. This calculation assumes no radius where the legs of the V meet; if there is a radius, the maximum gap will be less than the calculated value.

$$2R\cdot(1-\cos(W/(2R))) + \frac{ID - \sqrt{ID^2 - \left(2R\sin\left(\frac{W}{(2R)}\right)\right)^2}}{2} + t, \text{ where:} \quad \text{Equation 2}$$

W=width of the flat strip from which the lead is made, t=lead strip thickness, R=arc radius, ID=can inside diameter and (W/R)≦π.

Computer modeling can be used to develop shapes for the terminal end of the lead and tooling for forming the lead that will insure physical contact between the lead and the can sidewall and prevent damage to the lead during forming, taking into account considerations such as the properties and dimensions of the lead material and the dimensions of the electrode assembly and can. Computer modeling can also be used to design tooling for forming the terminal portion of the lead to the desired shape to avoid damage to the lead (e.g., tears, holes and wrinkles in the metal and abrasion of plating from the surface of the lead). Examples of commercially available software that can be used for computer modeling include ABAQUS (from Hibbit, Karlsson & Sorensen, Inc., Pawtucket, R.I., USA) and MARC K 7.3 (from MSC.Software, Los Angeles, Calif., USA).

The shape formed in the terminal portion of the lead can be advantageous in any of a number of ways. For example, compared to a lead with a planar terminal portion prior to insertion of the electrode assembly into the can, a shaped terminal portion can provide better spring characteristics, tolerate a greater difference in diameters between the side of the electrode assembly and the side of the can, and allow greater freedom of choice in lead material type and dimensions. Such advantages can result in improved cell characteristics, greater ease of cell manufacture and/or reduced cell manufacturing cost.

The cell container is often a metal can with a closed bottom such as the can in FIG. 1. The can material will depend in part of the active materials and electrolyte used in the cell. A common material type is steel. For example, the can may be made of steel, plated with nickel on at least the outside to protect the outside of the can from corrosion. The type of plating can be varied to provide varying degrees of corrosion resistance or to provide the desired appearance. The type of steel will depend in part on the manner in which the container is formed. For drawn cans the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover can be metal. Nickel plated steel may be used, but a stainless steel is often desirable, especially when the cover is in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 1, a type 304 soft annealed stainless steel with ASTM 8-9 grain size may be used, to provide the desired corrosion resistance and ease of metal forming. Formed covers may also be plated, with nickel for example.

The terminal cover should have good resistance to corrosion by water in the ambient environment, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket is made from any suitable thermoplastic material that provides the desired sealing properties. Material selection is based in part on the electrolyte composition. Examples of suitable materials include polypropylene, polyphenylene sulfide, tetrafluoride-perfluoroalkyl vinylether copolymer, polybutylene terephthalate and combinations thereof. Preferred gasket materials include polypropylene (e.g., PRO-FAX® 6524 from Basell Polyolefins, Wilmington, Del., USA), polybutylene terephthalate (e.g., CELANEX® PBT, grade 1600A from Ticona-U.S., Summit, N.J., USA) and polyphenylene sulfide (e.g., TECHTRON® PPS from Boedeker Plastics, Inc., Shiner, Tex., USA). Small amounts of other polymers, reinforcing inorganic fillers and/or organic compounds may also be added to the base resin of the gasket.

The gasket may be coated with a sealant to provide the best seal. Ethylene propylene diene terpolymer (EPDM) is a suitable sealant material, but other suitable materials can be used.

The vent bushing is made from a thermoplastic material that is resistant to cold flow at high temperatures (e.g., 75° C.).

The thermoplastic material comprises a base resin such as ethylene-tetrafluoroethylene, polybutylene terephthlate, polyphenylene sulfide, polyphthalamide, ethylene-chlorotrifluoroethylene, chlorotrifluoroethylene, perfluoro-alkoxyalkane, fluorinated perfluoroethylene polypropylene and polyetherether ketone. Ethylene-tetrafluoroethylene copolymer (ETFE), polyphenylene sulfide (PPS), polybutylene terephthalate (PBT) and polyphthalamide are preferred. The resin can be modified by adding a thermal-stabilizing filler to provide a vent bushing with the desired sealing and venting characteristics at high temperatures. The bushing can be injection molded from the thermoplastic material. TEFZEL® HT2004 (ETFE resin with 25 weight percent chopped glass filler) is a preferred thermoplastic material.

The vent ball can be made from any suitable material that is stable in contact with the cell contents and provides the desired cell sealing and venting characteristic. Glasses or metals, such as stainless steel, can be used.

The anode comprises a strip of lithium metal, sometimes referred to as lithium foil. The composition of the lithium can vary, though for battery grade lithium the purity is always high. The lithium can be alloyed with other metals, such as aluminum, to provide the desired cell electrical performance. Battery grade lithium-aluminum foil containing 0.5 weight percent aluminum is available from Chemetall Foote Corp., Kings Mountain, N.C., USA.

The anode may have a current collector, within or on the surface of the metallic lithium. As in the cell in FIG. 1, a separate current collector may not be needed, since lithium has a high electrical conductivity, but a current collector may be included, e.g., to maintain electrical continuity within the anode during discharge, as the lithium is consumed. When the anode includes a current collector, it may be made of copper because of its conductivity, but other conductive metals can be used as long as they are stable inside the cell.

In a preferred embodiment, the anode or negative electrode is free of a separate current collector and the one or more strips or foil of lithium metal or lithium-containing alloy solely serve as a current collector due to the relatively high conductivity of the lithium or lithium-containing alloy. By not utilizing a current collector, more space is available within the container for other components, such as active materials. Providing a cell without an anode current collector can also reduce cell cost. Preferably a single layer or strip of lithium or a lithium-containing alloy is utilized as the negative electrode.

Figure 16:
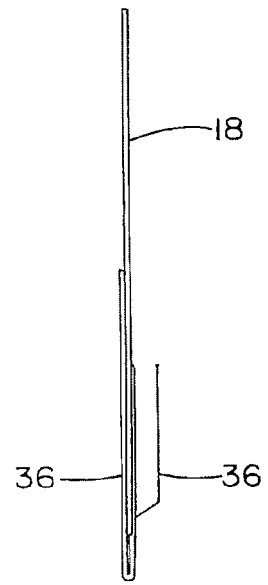
FIG. 16 is a side elevational view of the embodiment shown in FIG. 15 wherein the free end of the lead not connected to the lithium foil electrode has been folded around the bottom width end of the electrode and includes a portion that extends upwardly along the side of the electrode assembly and is spaced therefrom and adapted to contact an internal portion of a cell container.
Figure 17:
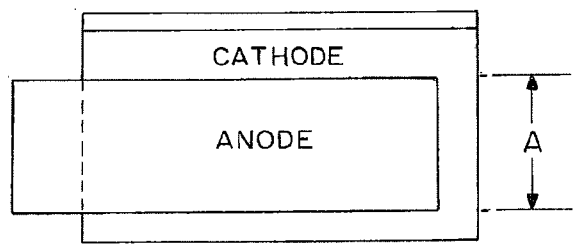
FIG. 17 is an illustration of an anode and a cathode and the interfacial electrode width "A"

An electrical lead can be made from a thin metal strip connecting the anode or negative electrode to one of the cell terminals (the can in the case of the FR6 cell shown in FIG. 1). This may be accomplished embedding an end of the lead within a portion of the anode or by simply pressing a portion such as an end of the lead onto the surface of the lithium foil. The lithium or lithium alloy has adhesive properties and generally at least a slight, sufficient pressure or contact between the lead and electrode will weld the components together. In one preferred embodiment, the negative electrode is provided with a lead prior to winding into a jellyroll configuration. For example, during production, a band comprising at least one negative electrode consisting of a lithium or lithium alloy is provided at a lead connecting station whereat a lead is welded onto the surface of the electrode at a desired location. The tabbed electrode is subsequently processed so that the lead is coined, if desired, in order to shape the free end of the lead not connected to the electrode. Subsequently, the negative electrode is combined with the remaining desired components of the electrode assembly, such as the positive electrode and separator, and wound into a jellyroll configuration. Preferably after the winding operation has been performed, the free negative electrode lead end is further processed, by bending into a configuration such as shown in FIG. 16, prior to insertion into the cell container.

The metal strip is often made from nickel or nickel plated steel and affixed directly to the lithium. Examples of other suitable negative electrode lead materials include, but are not limited to, copper, copper alloys, for example copper alloy 7025, a copper, nickel alloy comprising about 3% nickel, about 0.65% silicon, and about 0.15% magnesium, with the balance being copper and minor impurities; and copper alloy 110; and stainless steel. Lead materials should be chosen so that the composition is stable within the electrochemical cell including the nonaqueous electrolyte. Examples of metals generally to be avoided but can be present as impurities in relatively minor amounts are aluminum, iron and zinc.

The electrically conductive negative electrode lead has a sufficiently low resistance in order to allow sufficient transfer of electrical current through the lead and have minimal or no impact on service life of the cell. The resistance of the lead is generally less than 15 mΩ/cm and preferably less than 4.5 mΩ/cm. The broad range can be attained with 0.102 mm (0.004 inch) thick, 4.750 mm (0.187 inch) wide 304 stainless steel. For example, nickel plated cold rolled steel 0.056 mm (0.0022 inch) thick and 4.750 mm (0.187 inch) wide (i.e., 0.051 mm (0.002 inch) thick cold rolled steel and 2 layers of 0.0025 mm (0.0001 inch) thick nickel) has a resistance of 4.9 mΩ/cm. By utilizing a lead material more conductive than the nickel plated cold rolled steel, lead dimensions such as thickness and width can be reduced. However, leads that are too thin or narrow can increase lead/container contact resistance, which can make the cell more prone to voltage irregularities. Examples of suitable lead materials which provide desirable negative electrode lead resistance values include, but are not limited to, copper alloy 7025 having a thickness of 0.051 mm (0.002 inch) and a width of 4.750 mm (0.187 inch) which provides a tab resistance of 1.8 mΩ/cm, copper alloy 7025 having a thickness of 0.034 mm (0.00133 inch) and a width of 4.750 mm (0.187 inch) which provides a tab resistance of 2.7 mΩ/cm, copper alloy 7025 having a thickness of 0.025 mm (0.001 inch) and a width of 4.750 mm (0.187 inch) which provides a tab resistance of 3.6 mΩ/cm, and copper alloy 7025 having a thickness of 0.0338 mm (0.00133 inch) and a width of 3.175 mm (0.125 inch) which provides a tab resistance of 4.0 mΩ/cm.

As indicated hereinabove in the Background of the Invention, various prior art references utilize a metal current collector and/or lead that extends substantially an entire distance, either lengthwise or widthwise across the negative electrode, or a combination thereof in order to provide a portion of an electrical path between the negative electrode and another cell component, such as the container or a terminal. An important aspect of the present invention is the discovery that a negative electrode consisting of lithium or a lithium alloy is sufficiently conductive that the need for any major axial or radial contact is not required, even as the lithium or lithium alloy is depleted (thereby reducing or eliminating potential electron conductive routes across the active material of the electrode) during chemical reaction within the cell. Moreover, it has been further found, even more unexpectedly, that the length of a negative electrode lead that extends in an axial or widthwise direction of the negative electrode is even effective when the length in contact with the negative electrode extends less than or equal to 50% of the axial or widthwise distance of the negative electrode. Further unexpectedly, the substantial axial or radial contact of the lead with a negative electrode in the absence of a separate current collector can be substantially eliminated even when the cell contains an interfacial underbalance of lithium.

Notably, the aforementioned underbalance of lithium is with reference to the interfacial, theoretical anode to cathode input capacity ratio, also known and referred to herein as the interfacial, theoretical A/C ratio. The interfacial, theoretical input capacity of an electrode, i.e., the negative electrode or positive electrode, is the total contribution of the interfacially aligned electrochemically active material of the electrodes to the cell theoretical discharge capacity, based on the overall cell discharge reaction mechanisms and the total amount of active material contained within the portion of the active material mixture adjacent to active material in the opposite electrode, assuming complete reaction of all of the active material. The input capacity is generally expressed in Ah or mAh. When only one of the two major surfaces of an electrode is adjacent active material in the opposite electrode, only the active material on that side of the electrode, either the material on that side of a solid current collector sheet, in the case of a positive electrode of the present invention as the negative electrode is free of a current collector in a preferred embodiment, or that material in half the thickness of an electrode without a solid current collector sheet, is included in the determination of the interfacial, theoretical input capacity.

The interfacial, theoretical anode to cathode input capacity ratio as utilized within the present invention is calculated as follows:

Anode Capacity Per Linear Inch/Cathode Capacity Per Linear Inch

Each electrode capacity can be calculated based on the amount of electrochemically material provided on a standardized unit area basis, preferably by measuring the overall density of the material and calculating the capacity based on the theoretical capacity of the material. The capacity could also be measured by quantitatively determining the amount of a key elemental species in a standardized area of the electrodes (e.g., iron from the $FeS_2$ in the cathode or Li in the anode), assuming the elemental species accounts for the electrochemically active material and then calculating in a similar manner. Another experimental means of calculating interfacial theoretical A/C ratios can be found in U.S. Pat. No. 6,849,360, incorporated herein by reference.

As indicated herein, in various embodiments of the present invention, the interfacial, theoretical anode to cathode input capacity ratio is generally less than 1, desirably less than 0.99, and preferably less than 0.95.

When a current collector is not utilized in a negative electrode as preferred in various embodiments of the invention, the connection between the container and lithium-containing layer via the lead is important, especially in a primary cell, as electrical continuity must be maintained during cell discharge, even as the lithium is consumed. In view of the problem of maintaining electrical continuity, it was unexpectedly discovered that the contact area of the lead with a negative electrode consisting of a lithium foil, i.e., lithium or lithium-containing alloy, and free of a separate current collector can be reduced while substantially maintaining or even exceeding cell service based on a prior art embodiment. With the discovery of the present invention, the need for the lead to have a substantial lengthwise or widthwise contact with the negative electrode has been eliminated. Materials used for the lead can also maintain or improve conductivity when compared to nickel plated steel.

It has been discovered that a negative electrode lead need only be connected to a negative electrode consisting of lithium or a lithium alloy such that the lead has a sufficient area to form a sufficient weld between the lead and the negative electrode in order to prevent separation between the same during further processing or when the components are present in an assembled cell. It has been found that the connection location of the lead on the negative electrode is not limited and that the lead can be connected at any desired location of the negative electrode. Accordingly, in a configuration such as a jellyroll electrode, the negative electrode lead may be connected to the negative electrode anywhere along the length thereof, generally from a location along the inner end to a location along or near the outer circumference of the wound electrode assembly. The negative electrode lead can be oriented in generally any manner in relation to the length and width of the electrode. In one embodiment it is desirable to weld the negative electrode lead to a non-interfacial portion of the negative electrode, i.e., a portion of the negative electrode that does not participate in higher rate reactions, such as a flag portion of the electrode.

In one embodiment, contact between the negative electrode lead and the negative electrode, with the negative electrode being free from a separate current collector, is characterized by area of contact. Area or contact area as defined herein refers to the geometric measure of one or more two-dimensional regions of the negative electrode lead, i.e., length multiplied by width, in contact with a surface of the lithium or lithium alloy negative electrode, wherein a third dimension, for example surface roughness, is not taken into consideration. Thus, the connection between the negative electrode lead and the negative electrode lithium or lithium alloy is not limited to the negative electrode lead having a particular shape or design. Likewise, positioning of the lead on a surface of the negative electrode is not critical. Moreover, it has been found that the area of contact of the negative electrode lead in relation to the area of the negative electrode is substantially irrelevant. That is, negative electrodes having a relatively large area, for example length times width, do not necessarily need a negative electrode lead having a minimum area in contact with the electrode owing to the conductivity of the lithium or lithium alloy. In one embodiment of the present invention, the area of the negative electrode lead in contact with the negative electrode ranges generally from about 5.0 mm² to less than about 160 mm², desirably from about 8 mm² to about 111 mm² and preferably from about 10 mm² to about 92.6 mm². For example, a negative electrode lead having a width of 4.75 mm (0.187 inch), an area of 92.6 mm² in contact with the negative electrode would only extend about 50% of the lithium negative electrode width of one embodiment of a jellyroll electrode assembly for an L91 type cell. Comparatively, various embodiments of prior art negative electrode lead widths were 88% or more, such as about 96% of the lithium width and, therefore, having a negative electrode lead area in contact with a negative electrode of 163.9 mm² or about 177.6 mm², respectively.

In a further embodiment, contact between the lead and the negative electrode is characterized in terms of overall surface area contact. The area of the lead contact is calculated as described above. The area of the negative electrode is calculated geometrically for each surface of the electrode, for example by multiplying length by width. In the case of a strip-like negative electrode, the area of each side of the electrode is calculated and added together to determine the overall cumulative surface area of the electrode, and the thickness of the strip is not taken into consideration. In one embodiment of an FR6-type cylindrical LiFeS₂ electrochemical cell, a negative electrode strip that is wound into a jellyroll electrode assembly with the other assembly components has a length of about 312.5 mm and a width of 38.99 mm on one side which provides an overall surface area of 24,370 mm² accounting for both sides of the electrode and excluding thickness of the electrode strip. Therefore, a negative electrode lead having an area of 5.0 mm² in contact with the noted negative electrode strip provides an overall surface area contact between the lead and the negative electrode of 0.0205%, and a lead having an area of 160 mm² in contact with the negative electrode provides an overall surface area contact between the lead and the negative electrode of 0.656%.

Accordingly, in one embodiment of the present invention, the overall surface contact area between the lead and the negative electrode ranges generally from 0.0205% to about 0.70% or about 0.60%; desirably from about 0.0328% to about 0.46% or about 0.50%, and preferably from about 0.0410% to about 0.38% of the cumulative surface area of the negative electrode.

Figure 15:
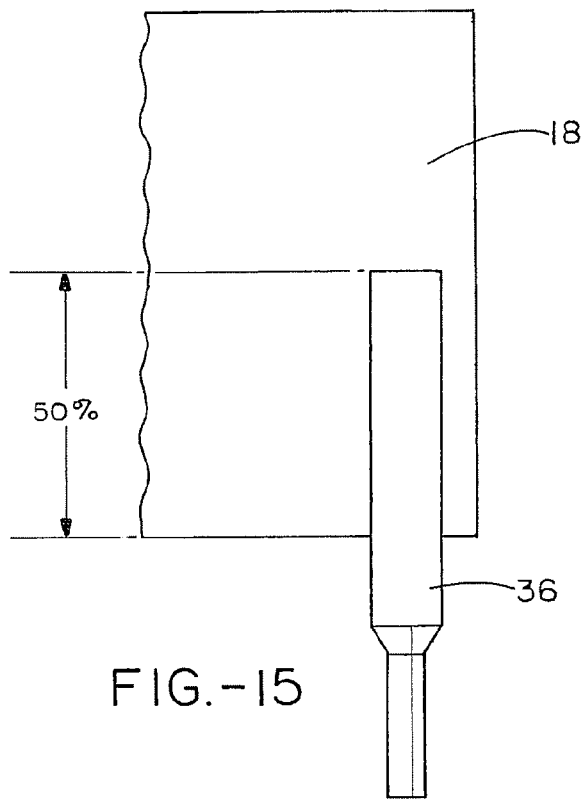
FIG. 15 is a schematic elevational representation of one embodiment of a negative electrode lead connected to a length end of a lithium foil electrode and extending a relatively short distance along the width of the electrode, which is partially shown in an unwound configuration.

In one embodiment, the lead 36 is connected to a length end portion of the lithium foil negative electrode 18, such as shown in FIG. 15. Preferably the lead 36 is attached to the outer length end portion of the negative electrode 18 near the outer end of the jellyroll or spiral wound electrode assembly, although other attachment locations are possible. Attachment of the lead to the outer length end of the negative electrode 18 is desirable as such lead placement allows for relative ease of manufacture when compared to attachment of the lead to other locations of the negative electrode. The negative electrode lead can be placed any distance from the outer end of the electrode length, such as about 2.2 mm. Of course, it is to be understood that the lead can be connected to alternative areas of the negative electrode in other embodiments.

In one embodiment such as illustrated in FIG. 15, the lead extends a predetermined distance along the width of the negative electrode, i.e., for purposes of the invention the width is perpendicular to the negative electrode length in the case of a rectangular- or square-shaped electrode, with the width generally being substantially parallel to the longitudinal axis or axial direction of a cylindrical cell after the electrode assembly has been inserted therein, preferably after being wound into a jellyroll configuration. In order to obtain desirable conductivity, the lead extends a distance generally from about 10% to less than 88%, desirably from about 10% to about 60% or about 80%, and preferably from about 10% to 50% of the negative electrode width, measured along the width portion to which the lead is connected. When the lead has a contact distance measured in relation to the width of the electrode of 88% or more, the arrangement was found to not offer any substantial benefit and can increase the cost of the cell. When the lead contact distance measured in relation to the width of the electrode is less than about 10%, it may be difficult to obtain a sufficient weld between the negative electrode lead and the negative electrode itself. However, the lead can extend a distance less than 10% of the negative electrode width so long as a sufficient weld or contact can be maintained between the lead and the negative electrode.

Figure 18:
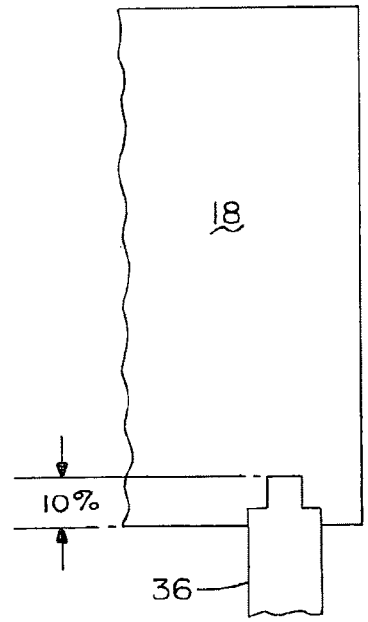
FIG. 18 illustrates one embodiment of connection of a shaped negative electrode lead connected to a negative electrode free of a separate current collector.

In a further embodiment as illustrated in FIG. 18, the portion of the negative electrode lead 36 connected to negative electrode 18 exhibits a "T"-shaped structure with the wider portion of the welded lead located toward the negative electrode lower edge in order to aid in preventing separation from the negative electrode during additional forming of the free end of the lead, such as to bend the free end and/or form a shaped lead in order to promote desirable contact between the negative electrode lead and the container or another contact after insertion into the cell container. Examples of additional negative electrode lead portions in contact with the negative electrode include spade shaped lead ends, and wire filaments or the like that can be welded to a flat lead stock.

In order to contact a portion of the container, a second, free end of the lead extends from the portion of the lead contacting the electrode. In a preferred embodiment, the lead is connected to the negative electrode so that the free end extends out from a lower end of the foil negative electrode such as shown in FIG. 15, although other configurations can be utilized. The free lead end can be manipulated as desired, i.e., one or more of positioned, bent, deformed, etc., prior to insertion into the container, and preferably after the negative electrode, including the lead, the positive electrode and separator are spirally wound into an electrode assembly, such as described herein. Accordingly, any of the reliable pressure contact structures described herein for the free lead end can be utilized to provide contact between the negative electrode lead and a portion of the container, preferably the sidewall.

FIG. 16 illustrates one embodiment of a shaped lead 36, wherein approximately 50% of the lead as shown is pressure welded to the lithium electrode, and the free end of the lead extending from the bottom width end of the negative electrode is folded backwards upon itself a distance from the portion in contact with the electrode, extending across and covering a portion of the width end edge, and further extending upwardly along the side of the electrode. Additionally, the lead is crimped to form a spring-like portion extending parallel to the axial direction of the electrode so that the terminal free lead end forms a desirable pressure contact with the container sidewall after insertion in the cell container. The folded lead end overlaps a portion of the electrode welded lead portion. In a preferred embodiment, the outer circumference of the wound electrode includes one or more of a cover wrap and separator which can be utilized to prevent any exposed lithium from adhering to the container during insertion of the electrode assembly thereby preventing possible tearing of the negative electrode.

The cathode is in the form of a strip that comprises a current collector and a mixture that includes one or more electrochemically active materials, usually in particulate form. Iron disulfide ($FeS_2$) is a preferred active material. In a $Li/FeS_2$ cell the active material comprises greater than 50 weight percent $FeS_2$. The cathode can also contain one or more additional active materials, depending on the desired cell electrical and discharge characteristics. The additional active cathode material may be any suitable active cathode material. Examples include $Bi_2O_3$, $C_2F$, $CF_x$, $(CF)_n$, $CoS_2$, $CuO$, $CuS$, $FeS$, $FeCuS_2$, $MnO_2$, $Pb_2Bi_2O_5$ and $S$. More preferably the active material for a $Li/FeS_2$ cell cathode comprises at least 95 weight percent $FeS_2$, yet more preferably at least 99 weight percent $FeS_2$, and most preferably $FeS_2$ is the sole active cathode material. $FeS_2$ having a purity level of at least 95 weight percent is available from Washington Mills, North Grafton, Mass., USA; Chemetall GmbH, Vienna, Austria; and Kyanite Mining Corp., Dillwyn, Va., USA.

In addition to the active material, the cathode mixture contains other materials. A binder is generally used to hold the particulate materials together and adhere the mixture to the current collector. One or more conductive materials such as metal, graphite and carbon black powders may be added to provide improved electrical conductivity to the mixture. The amount of conductive material used can be dependent upon factors such as the electrical conductivity of the active material and binder, the thickness of the mixture on the current collector and the current collector design. Small amounts of various additives may also be used to enhance cathode manufacturing and cell performance. The following are examples of active material mixture materials for $Li/FeS_2$ cell cathodes. Graphite: KS-6 and TIMREX® MX15 grades synthetic graphite from Timcal America, Westlake, Ohio, USA. Carbon black: Grade C55 acetylene black from Chevron Phillips Company LP, Houston, Tex., USA. Binder: ethylene/propylene copolymer (PEPP) made by Polymont Plastics Corp. (formerly Polysar, Inc.) and available from Harwick Standard Distribution Corp., Akron, Ohio, USA; non-ionic water soluble polyethylene oxide (PEO): POLYOX® from Dow Chemical Company, Midland, Mich., USA; and G1651 grade styrene-ethylene/butylenes-styrene (SEBS) block copolymer from Kraton Polymers, Houston, Tex. Additives: FLUO HT® micronized polytetrafluoroethylene (PTFE) manufactured by Micro Powders Inc., Tarrytown, N.Y., USA (commercially available from Dar-Tech Inc., Cleveland, Ohio, USA) and AEROSIL® 200 grade fumed silica from Degussa Corporation Pigment Group, Ridgefield, N.J.

The current collector may be disposed within or imbedded into the cathode surface, or the cathode mixture may be coated onto one or both sides of a thin metal strip. Aluminum is a commonly used material. The current collector may extend beyond the portion of the cathode containing the cathode mixture. This extending portion of the current collector can provide a convenient area for making contact with the electrical lead connected to the positive terminal. It is desirable to keep the volume of the extending portion of the current collector to a minimum to make as much of the internal volume of the cell available for active materials and electrolyte.

A preferred method of making $FeS_2$ cathodes is to roll coat a slurry of active material mixture materials in a highly volatile organic solvent (e.g., trichloroethylene) onto both sides of a sheet of aluminum foil, dry the coating to remove the solvent, calendar the coated foil to compact the coating, slit the coated foil to the desired width and cut strips of the slit cathode material to the desired length. It is desirable to use cathode materials with small particle sizes to minimize the risk of puncturing the separator. For example, $FeS_2$ is preferably sieved through a 230 mesh (62 µm) screen before use.

The cathode is electrically connected to the positive terminal of the cell. This may be accomplished with an electrical lead, often in the form of a thin metal strip or a spring, as shown in FIG. 1. The lead is often made from nickel plated stainless steel.

The separator is a thin microporous membrane that is ion-permeable and electrically nonconductive. It is capable of holding at least some electrolyte within the pores of the separator. The separator is disposed between adjacent surfaces of the anode and cathode to electrically insulate the electrodes from each other. Portions of the separator may also insulate other components in electrical contact with the cell terminals to prevent internal short circuits. Edges of the separator often extend beyond the edges of at least one electrode to insure that the anode and cathode do not make electrical contact even if they are not perfectly aligned with each other. However, it is desirable to minimize the amount of separator extending beyond the electrodes.

To provide good high power discharge performance it is desirable that the separator have the characteristics (pores with a smallest dimension of at least 0.005 µm and a largest dimension of no more than 5 µm across, a porosity in the range of 30 to 70 percent, an area specific resistance of from 2 to 15 ohm-cm$^2$ and a tortuosity less than 2.5) disclosed in U.S. Pat. No. 5,290,414, issued Mar. 1, 1994, and hereby incorporated by reference.

Suitable separator materials should also be strong enough to withstand cell manufacturing processes as well as pressure that may be exerted on the separator during cell discharge without tears, splits, holes or other gaps developing that could result in an internal short circuit. To minimize the total separator volume in the cell, the separator should be as thin as possible, preferably less than 25 μm thick, and more preferably no more than 22 μm thick, such as 20 μm or 16 μm. A high tensile stress is desirable, preferably at least 800, more preferably at least 1000 kilograms of force per square centimeter (kgf/cm$^2$). For an FR6 type cell the preferred tensile stress is at least 1500 kgf/cm$^2$ in the machine direction and at least 1200 kgf/cm$^2$ in the transverse direction, and for a FR03 type cell the preferred tensile strengths in the machine and transverse directions are 1300 and 1000 kgf/cm$^2$, respectively. Preferably the average dielectric breakdown voltage will be at least 2000 volts, more preferably at least 2200 volts and most preferably at least 2400 volts. The preferred maximum effective pore size is from 0.08 μm to 0.40 μm, more preferably no greater than 0.20 μm. Preferably the BET specific surface area will be no greater than 40 m$^2$/g, more preferably at least 15 m$^2$/g and most preferably at least 25 m$^2$/g. Preferably the area specific resistance is no greater than 4.3 ohm-cm$^2$, more preferably no greater than 4.0 ohm-cm$^2$, and most preferably no greater than 3.5 ohm-cm$^2$. These properties are described in greater detail in U.S. patent application Ser. No. 10/719,425, filed on Nov. 21, 2003, which is hereby incorporated by reference.

Separator membranes for use in lithium batteries are often made of polypropylene, polyethylene or ultrahigh molecular weight polyethylene, with polyethylene being preferred. The separator can be a single layer of biaxially oriented microporous membrane, or two or more layers can be laminated together to provide the desired tensile strengths in orthogonal directions. A single layer is preferred to minimize the cost. Suitable single layer biaxially oriented polyethylene microporous separator is available from Tonen Chemical Corp., available from EXXON Mobile Chemical Co., Macedonia, N.Y., USA. Setela F20DHI grade separator has a 20 μm nominal thickness, and Setela 16MMS grade has a 16 μm nominal thickness.

The anode, cathode and separator strips are combined together in an electrode assembly. The electrode assembly may be a spirally wound design, such as that shown in FIG. 1, made by winding alternating strips of cathode, separator, anode and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing. The anode can be the outermost electrode, as shown in FIG. 1, or the cathode can be the outermost electrode. Either electrode can be in electrical contact with the cell container, but internal short circuits between the outmost electrode and the sidewall of the container can be avoided when the outermost electrode is the same electrode that is intended to be in electrical contact with the can.

In one or more embodiments of the present invention, the electrode assembly is formed with the positive electrode having electrochemically active material selectively deposited thereon for improved service and more efficient utilization of the electrochemically active material of the negative electrode. Non-limiting examples of selectively deposited configurations of electrochemically active material on the positive electrode and further, an electrochemical cell, including a positive container, are set forth in U.S. patent application Ser. No. 10/493,314, filed Jul. 26, 2006 and U.S. patent application Ser. No. 11/581,992, filed Oct. 17, 2006 which is a continuation-in-part application of the preceding serial number, both fully herein incorporated by reference.

In one embodiment, a primary electrochemical cell comprises a non-intercalating negative lithium electrode and an iron disulfide positive electrode, wound into a jellyroll configuration with a separator disposed between the two electrodes. The jellyroll is disposed in a cylindrical housing along with a non-aqueous organic electrolyte. Notably, the iron disulfide is coated onto a substrate, but in a manner that leaves a partially uncoated portion on one side of the carrier that extends from one axial edge of the substrate toward its opposing axial edge. The uncoated portion follows a longitudinal axis along the height of the jellyroll/cell container, when the jellyroll is created. A second partially uncoated portion may be provided, preferably on the opposite side of the substrate, so as to form a second longitudinal axis. These longitudinal axes may overlap (i.e., be directly proximate to one another but on opposite sides of the substrate) or be offset from one another. The uncoated portion can then be aligned on the outer circumference and/or the innermost core of the jellyroll, eliminating the need to place lithium adjacent to the uncoated portion(s), reducing the amount of lithium required and generally allowing for a cost savings in the construction of the cell.

In a further embodiment, an electrode assembly comprises a negative electrode of lithium and a positive electrode with electrochemically active material coated on a foil carrier. Here again, the electrodes are spirally wound with a separator into a jellyroll and disposed in a cylindrical container along with a non-aqueous electrolyte. In this case, the conductive carrier has a lengthwise section running from one end of the foil to another without coating on either side that is preferably oriented at the top end of the jellyroll. As above, at least one uncoated portion extends across the width of the foil carrier. When the jellyroll is wound, it is preferable to orient the uncoated portion on the outermost circumference of the jellyroll. If multiple uncoated portions are provided, the first and second uncoated portions may partially or completely overlap (i.e., be proximate to one another but on opposing sides of the foil carrier). However, if a third uncoated portion is provided by a coated portion (i.e., except for the uncoated lengthwise section), the first and third sections must have a coated portion interposed therebetween.

Various coating patterns and additional teachings regarding patterned positive electrodes are set forth in the incorporated references.

Rather than being spirally wound, the electrode assembly may be formed by folding the electrode and separator strips together. The strips may be aligned along their lengths and then folded in an accordion fashion, or the anode and one electrode strip may be laid perpendicular to the cathode and another electrode strip and the electrodes alternately folded one across the other (orthogonally oriented), in both cases forming a stack of alternating anode and cathode layers.

The electrode assembly is inserted into the housing container. In the case of a spirally wound electrode assembly, whether in a cylindrical or prismatic container, the major surfaces of the electrodes are perpendicular to the sidewall(s) of the container (in other words, the central core of the electrode assembly is parallel to a longitudinal axis of the cell). Folded electrode assemblies are typically used in prismatic cells. In the case of an accordion-folded electrode assembly, the assembly is oriented so that the flat electrode surfaces at opposite ends of the stack of electrode layers are adjacent to opposite sides of the container. In these configurations the majority of the total area of the major surfaces of the anode is adjacent the majority of the total area of the major surfaces of the cathode through the separator, and the outermost portions of the electrode major surfaces are adjacent to the sidewall of the container. In this way, expansion of the electrode assembly due to an increase in the combined thicknesses of the anode and cathode is constrained by the container sidewall(s).

A nonaqueous electrolyte, containing water only in very small quantities as a contaminant (e.g., no more than about 500 parts per million by weight, depending on the electrolyte salt being used), is used in the battery cell of the invention. Any nonaqueous electrolyte suitable for use with lithium and active cathode material may be used. The electrolyte contains one or more electrolyte salts dissolved in an organic solvent. For a Li/FeS$_2$ cell examples of suitable salts include lithium bromide, lithium perchlorate, lithium hexafluorophosphate, potassium hexafluorophosphate, lithium hexafluoroarsenate, lithium trifluoromethanesulfonate and lithium iodide; and suitable organic solvents include one or more of the following: dimethyl carbonate, diethyl carbonate, methylethyl carbonate, ethylene carbonate, propylene carbonate, 1,2-butylene carbonate, 2,3-butylene carbonate, methyl formate, γ-butyrolactone, sulfolane, acetonitrile, 3,5-dimethylisoxazole, n,n-dimethyl formamide and ethers. The salt/solvent combination will provide sufficient electrolytic and electrical conductivity to meet the cell discharge requirements over the desired temperature range. Ethers are often desirable because of their generally low viscosity, good wetting capability, good low temperature discharge performance and good high rate discharge performance. This is particularly true in Li/FeS$_2$ cells because the ethers are more stable than with MnO$_2$ cathodes, so higher ether levels can be used. Suitable ethers include, but are not limited to acyclic ethers such as 1,2-dimethoxyethane, 1,2-diethoxyethane, di(methoxyethyl) ether, triglyme, tetraglyme and diethyl ether; and cyclic ethers such as 1,3-dioxolane, tetrahydrofuran, 2-methyl tetrahydrofuran and 3-methyl-2-oxazolidinone.

Specific anode, cathode and electrolyte compositions and amounts can be adjusted to provide the desired cell manufacturing, performance and storage characteristics, as disclosed in U.S. patent application Ser. No. 10/719,425, which is referenced above.

The cell can be closed and sealed using any suitable process. Such processes may include, but are not limited to, crimping, redrawing, colleting and combinations thereof. For example, for the cell in FIG. 1, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold retain the gasket, cover assembly, PTC device and terminal cover and complete the sealing of the open end of the can by the gasket.

The above description is particularly relevant to cylindrical Li/FeS$_2$ cells, such as FR6 and FR03 types, as defined in International Standards IEC 60086-1 and IEC 60086-2, published by the International Electrotechnical Commission, Geneva, Switzerland. However, the invention may also be adapted to other cell sizes and shapes and to cells with other electrode assembly, housing, seal and pressure relief vent designs. Other cell types in which the invention can be used include primary and rechargeable nonaqueous cells, such as lithium/manganese dioxide and lithium ion cells. The electrode assembly configuration can also vary. For example, it can have spirally wound electrodes, as described above, folded electrodes, or stacks of strips (e.g., flat plates). The cell shape can also vary, to include cylindrical and prismatic shapes, for example.

Features of the invention and its advantages are further illustrated in the following examples.

Example 1

Computer modeling was used to evaluate several negative electrode lead designs suitable for use in FR6 and FR03 cells with electrode assemblies similar to that illustrated in FIG. 1. The model was used to determine the spring force that could be exerted by the terminal end of a lead similar to the negative electrode lead in FIGS. 1 and 2. The spring force determined should approximate the amount of force exerted by the terminal portion of the lead against the inside surface of the sidewall of the can.

The model used the following material properties for 0.051 mm (0.002 inch) thick nickel plated, cold rolled steel strip for the leads: Young's modulus=$2.07 \times 10^8$ Pa ($3.00 \times 10^7$ lb./in$^2$), Poisson's ratio=0.285 and initial yield strength=251,000 Pa (36,400 lb./in$^2$).

Three different shapes were evaluated for the terminal portion of the lead (the portion adjacent to the external surface of the electrode assembly, above the bend around the bottom of the electrode assembly, prior to insertion of the electrode assembly into the can): flat, V-shaped (FIG. 4A) and arc-shaped (FIG. 4B), with the grooves of the V- and arc-shaped leads located longitudinally along the centers of the terminal portions of the strips so that the grooves would be disposed parallel to the longitudinal axes of the cells after insertion of the electrode assemblies into the cans.

Figure 6A:
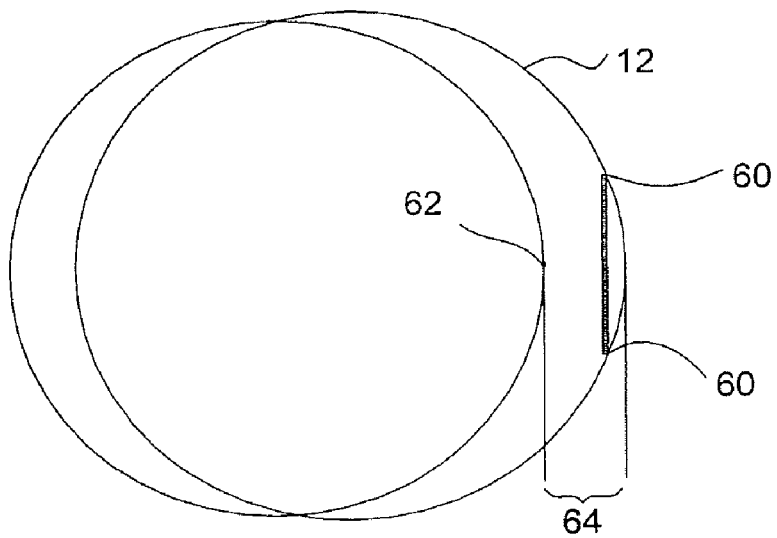
FIG. 6A is a cross sectional view of an electrode assembly, flat electrode lead and can showing their starting positions in a model used to determine spring force of the lead against the can.
Figure 6B:
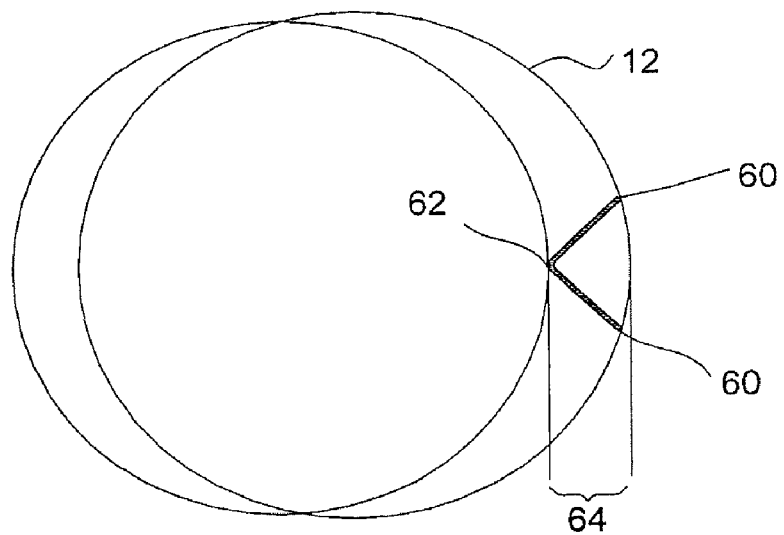
FIG. 6B is a cross sectional view of an electrode assembly, V-shaped electrode lead and can showing their starting positions in a model used to determine spring force of the lead against the can.
Figure 6C:
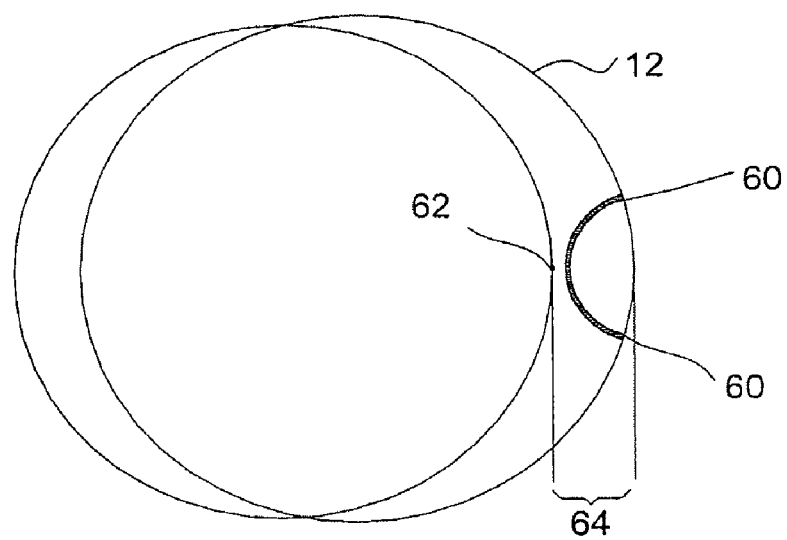
FIG. 6C is a cross sectional view of an electrode assembly, arc-shaped electrode lead and can showing their starting positions in a model used to determine spring force of the lead against the can.

In the model a cross section of the outside diameter of the electrode assembly and the terminal portion of the lead were superimposed over a cross section of the inside diameter of the can, using the initial lead shape and dimensions. An electrode assembly diameter of 12.90 mm (0.508 inch), a can inside diameter of 13.44 mm (0.529 inch), and a lead strip width of 4.75 mm (0.187 inch) were used in the FR6 cell evaluations; an electrode assembly diameter of 9.25 mm (0.364 inch), a can inside diameter of 9.70 mm (0.382 inch) and a lead strip width of 3.18 mm (0.125 inch) were used in the FR03 cell evaluations. For each cell size the starting positions of the electrode assembly and lead relative to the can were the same in each case and were established based on a lead initially formed into a V shape with a leg angle of 90 degrees, as shown in FIG. 6B (not to scale). The edges 60 of the lead were placed in contact with the can 12, and the electrode assembly was placed in contact with the base of the V at point 62. In the starting positions for each of the other cases evaluated, the edges 60 of the leads were placed in contact with the can 12 and the distance 64 between point 62 on the electrode assembly, through the center of the lead, to the can 12 was 1.88 mm (0.074 inch) for the FR6 cells and 1.24 mm (0.049 inch) for the FR03 cells. FIGS. 6A and 6C show the starting positions for FR6 cells with flat and arc-shaped leads, respectively, made from the same material as the V-shaped lead in FIG. 6B. Because the distance 64 was held constant, there is a gap between the lead and the electrode assembly in FIGS. 6A and 6C. In the model the position of the electrode assembly was moved to the right (FIGS. 6A-6C), reducing the distance 64, and the spring force of the lead against the can was determined as a function of the displacement to the right of point 62. In cases where there was a gap between point 62 and the lead, there was no spring force until the electrode was displaced sufficiently to contact and begin to push against the lead.

The results of the modeling are shown in FIGS. 7 through 14, which show spring force of the lead against the can (g/cm of length of the shaped portion of the lead) as a function of displacement of the electrode assembly (mm) from the starting point; Table 1 summarizes the cell type and lead shape represented in each of the drawings.

TABLE 1

| FIG. | Cell Type | Lead Shape |
|---|---|---|
| 7 | FR6 | Flat |
| 8 | FR6 | V-shaped, 90° leg angle |
| 9 | FR6 | Arc-shaped, 1.78 mm (0.070 inch) arc radius |
| 10 | FR6 | Arc-shaped, 1.91 mm (0.075 inch) arc radius |
| 11 | FR6 | Arc-shaped, 2.29 mm (0.090 inch) arc radius |
| 12 | FR03 | Flat |
| 13 | FR03 | V-shaped, 90° leg angle |
| 14 | FR03 | Arc-shaped, 1.40 mm (0.055 inch) arc radius |

The graphs in FIGS. 7-14 show the changes in spring force as the electrode assemblies are displaced to the right. The amount of displacement from the starting position (FIGS. 6A-6C) that places the left side of the electrode assembly (opposite point 62) against the inside left surface of the can for FR6 cells with a 12.90 mm diameter electrode assembly and FR03 cells with a 9.25 mm electrode assembly is indicated by line E. This corresponds to the position of the electrode assembly after insertion into the can when the electrode assembly is as far to the left as possible. For electrode assemblies with smaller or larger diameters, line E would be shifted left or right, respectively. The amount of displacement that places point 62 being against the inside right surface of the can is indicated by line F. In those cases where there is no gap between the lead and the electrode assembly in the starting position (FIGS. 8 and 13), the spring force begins to increase immediately with displacement of the electrode assembly to the right and a corresponding compression of the lead (deformation of the initial lead shape). In the other cases the spring force does not begin to rise above zero until there is no gap remaining. Points A1, B1, C1 and D1 show the spring force for incremental displacements of 0.127 mm (0.005 inch) for FR6 cells and 0.102 mm (0.004 inch) for FR03 cells. Points A2, B2, C2 and D2 show the changes in spring force if the electrode assembly is displaced back to the left (0.127 mm (0.005 inch) for FR6 cells and 0.102 mm (0.004 inch) for FR03 cells) after being initially displaced to the right to points A1, B1, C1 and D1, respectively. This corresponds to what would happen during insertion of the electrode assembly into the can, for example, if the lead is over-compressed (deformed more than the minimum necessary for the electrode assembly to fit within the inside diameter of the can) and then allowed to spring back against the can. The spring force is lower because of partial permanent deformation of the lead, due to the yield strength of the lead being exceeded in parts of the lead. In general, for a given amount of displacement of the electrode assembly, the V- and arc-shaped leads provide more spring force than a flat lead.

Figure 7:
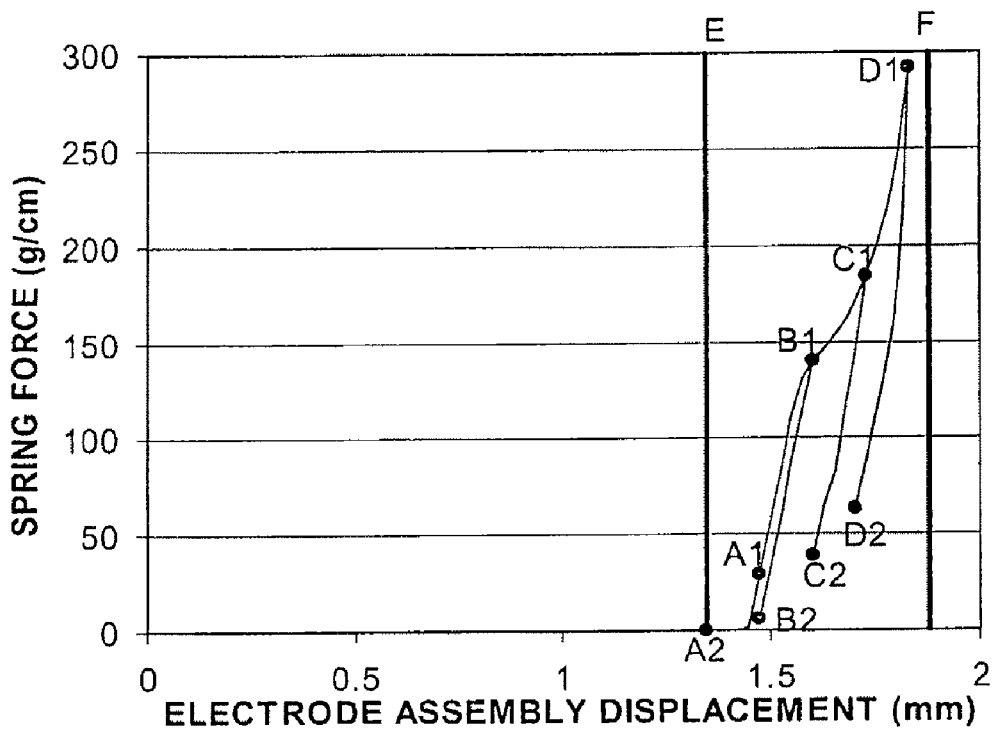
FIG. 7 is a graph, generated by a computer model, showing spring force as a function of electrode assembly displacement, for a 0.051 mm thick by 4.75 mm wide flat electrode lead.

In FIG. 7 (an FR6 cell with a flat lead), the spring force is zero at the starting point and until the electrode assembly is displaced more than 1.42 mm (0.056 inch) to the right. Because the spring force does not rise above zero until the electrode assembly is displaced beyond line E, there is no spring force between the lead and the can for an electrode assembly diameter of 12.90 mm or less. In other words, with an electrode assembly diameter of 12.90 mm, there is no spring force between the lead and the can. An additional displacement of 0.076 mm (0.003 in), corresponding to an electrode assembly diameter greater than 12.98 mm (0.511 inch) is required.

Figure 8:
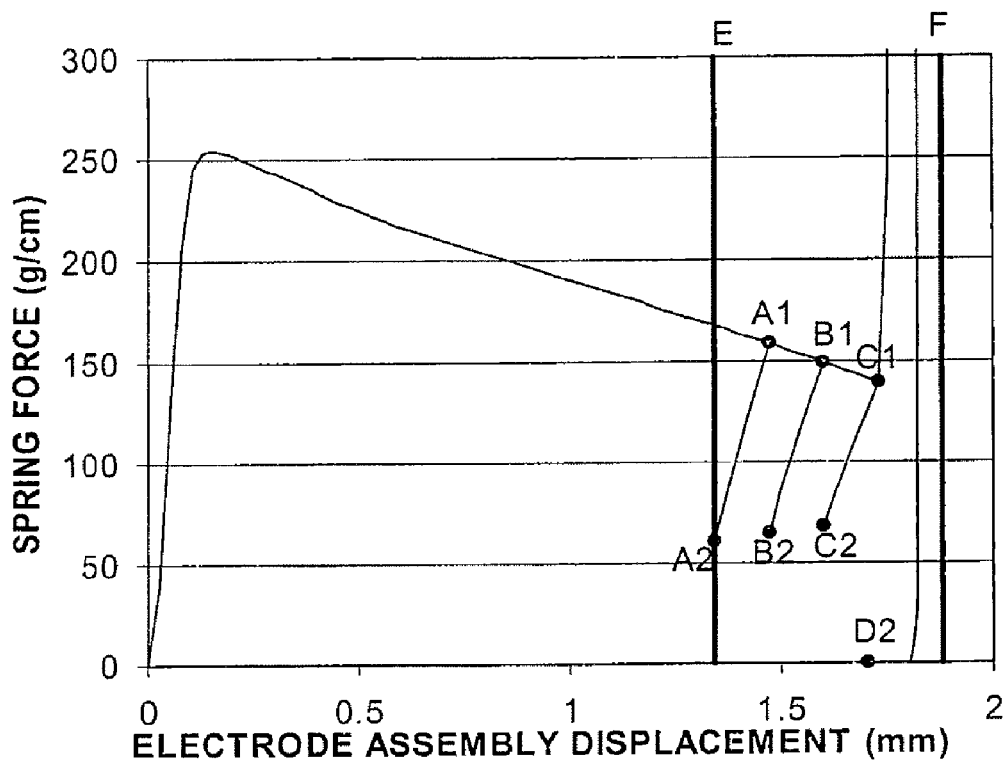
FIG. 8 is a graph, generated by a computer model, showing spring force as a function of electrode assembly displacement, for a V-shaped electrode lead with a leg angle of 90 degrees made from a strip of 0.051 mm thick by 4.75 mm wide metal strip.

In FIG. 8 (an FR6 cell with a 90 degree V-shaped lead), the spring force begins to rise as soon as displacement of the electrode assembly to the right begins. When the electrode assembly is displaced far enough that the left side of the electrode assembly is even with the inside left surface of the can, the spring force is 167 g/cm (corresponding to the intersection of the graph with line E. This means that in a cell with an electrode assembly diameter of 12.90 there will be spring force between the lead and the can, unless the lead is over-compressed too much. Excessive overcompression can result with a displacement beyond point C1, to where there are multiple points of contact between the deformed lead and the can and the spring force rises rapidly (off the graph), until the yield strength of the lead material is exceeded and the spring force drops to zero after only a small amount of springback. FIG. 8 shows that an electrode assembly diameter as small as about 11.55 mm (1.35 mm smaller than the minimum electrode diameter indicated in FIG. 7) can be used in a cell with a can inside diameter of 13.44 mm and the lead used in this evaluation.

Figure 9:
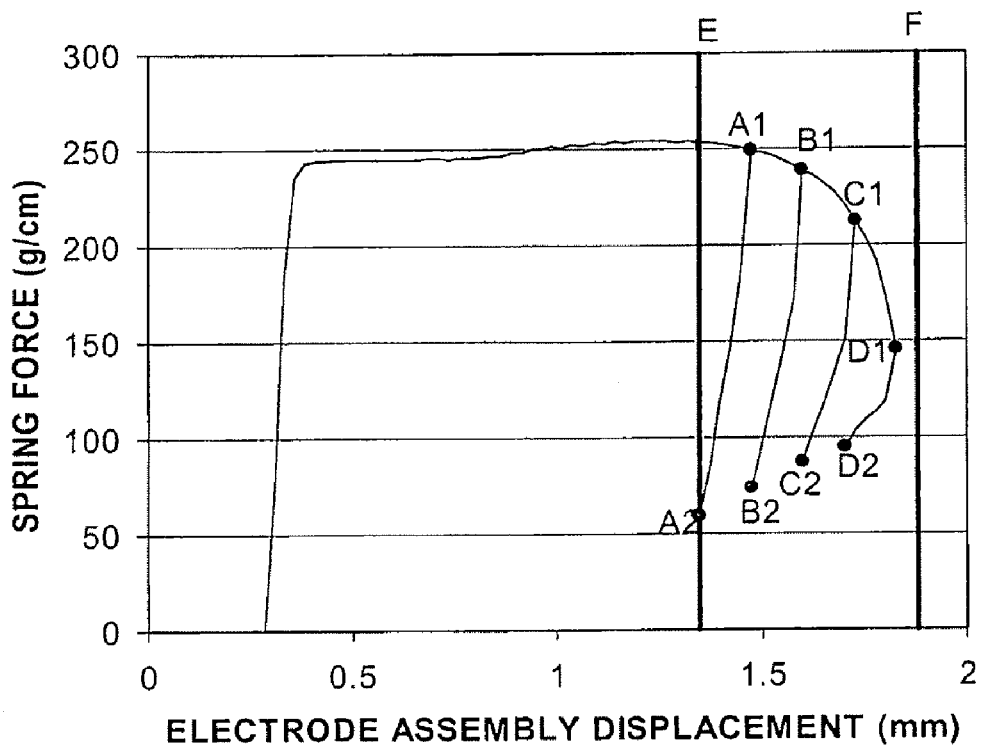
FIG. 9 is a graph, generated by a computer model, showing spring force as a function of electrode assembly displacement, for an arc-shaped electrode lead with an arc radius of 1.78 mm made from a strip of 0.051 mm thick by 4.75 mm wide metal strip.

In FIG. 9 (an FR6 cell with a 1.78 mm radius arc-shaped lead), there is a small gap between the electrode assembly and the lead at the starting point of the model, but the spring force is above zero at a displacement corresponding to a 12.90 mm diameter electrode assembly positioned against the inside left surface of the can. Line E can be shifted left by as much as 1.07 mm (0.042 inch) and still have a spring force greater than zero, so a smaller diameter electrode assembly (greater than 11.83 mm) can be used with this lead.

Figure 10:
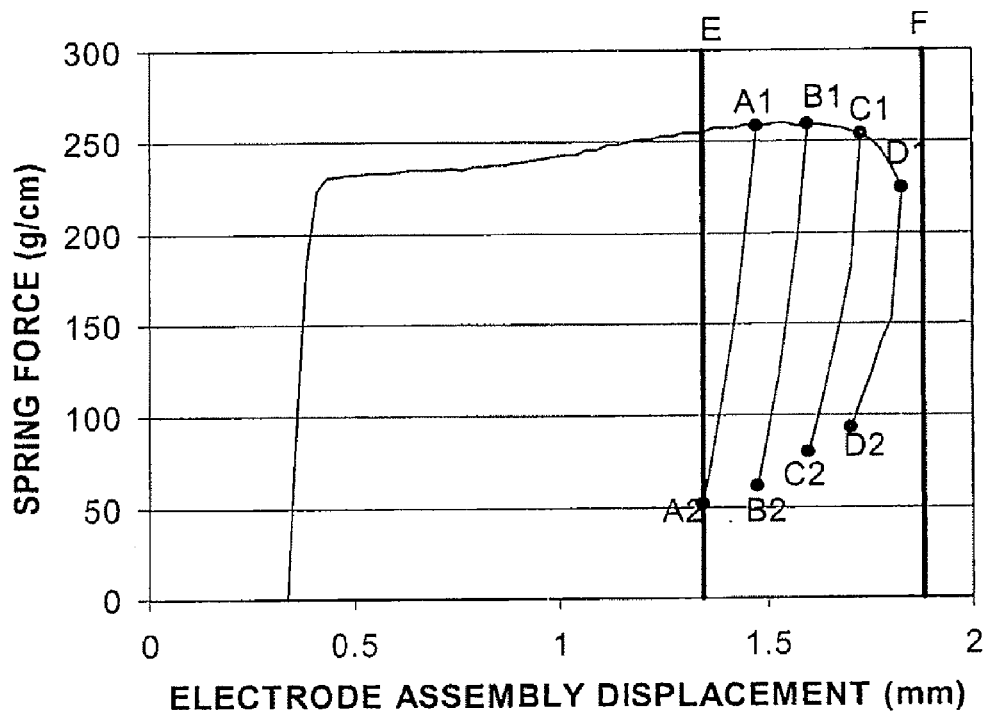
FIG. 10 is a graph, generated by a computer model, showing spring force as a function of electrode assembly displacement, for an arc-shaped electrode lead with an arc radius of 1.91 mm made from a strip of 0.051 mm thick by 4.75 mm wide metal strip.

The graph in FIG. 10 is similar to that in FIG. 9. Because points A1, B1, C1 and D1 are generally higher than the corresponding points in FIG. 9, spring forces should be higher with a 1.91 mm vs. 1.78 mm arc radius if there is no overcompression of the lead during insertion of the electrode assembly into the can. The minimum electrode assembly that can be used with this lead design is only slightly larger that determined from FIG. 9.

Figure 11:
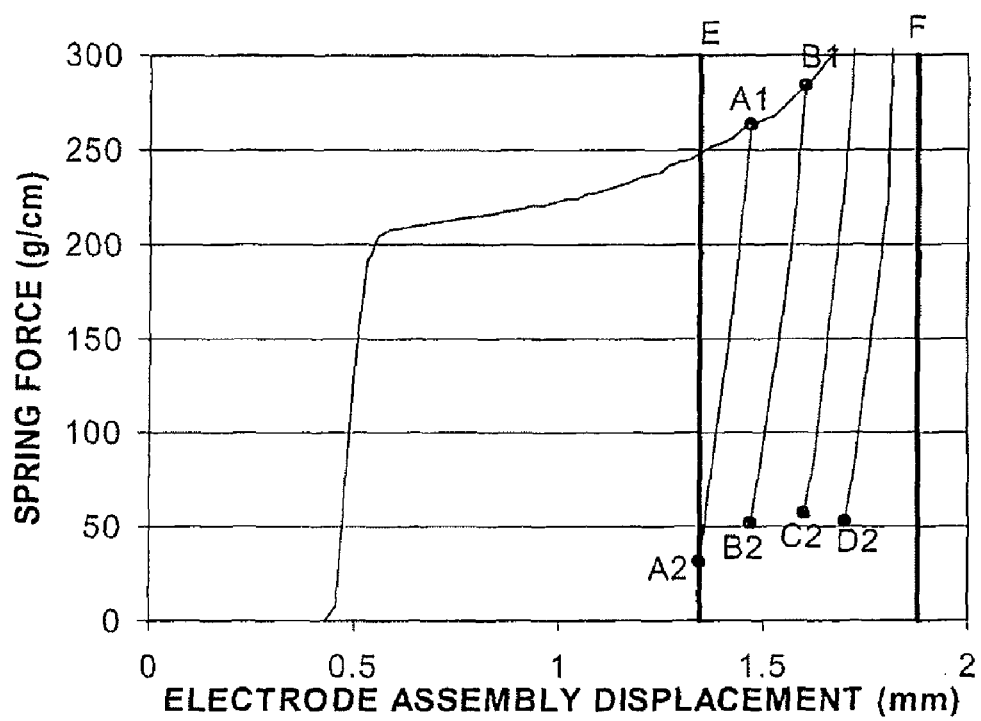
FIG. 11 is a graph, generated by a computer model, showing spring force as a function of electrode assembly displacement, for an arc-shaped electrode lead with an arc radius of 2.29 mm made from a strip of 0.051 mm thick by 4.75 mm wide metal strip.

The graph in FIG. 11 is similar to those in FIGS. 9 and 10. A comparison shows that a 2.29 mm arc radius results in higher spring forces for displacements beyond point B1 (point D1 is above the maximum spring force shown in FIG. 11), but there is somewhat more loss in spring force that results from overcompression, and the minimum electrode assembly diameter that can be used is slightly larger than those for leads with 1.91 mm and 1.78 mm arc radii.

Figure 12:
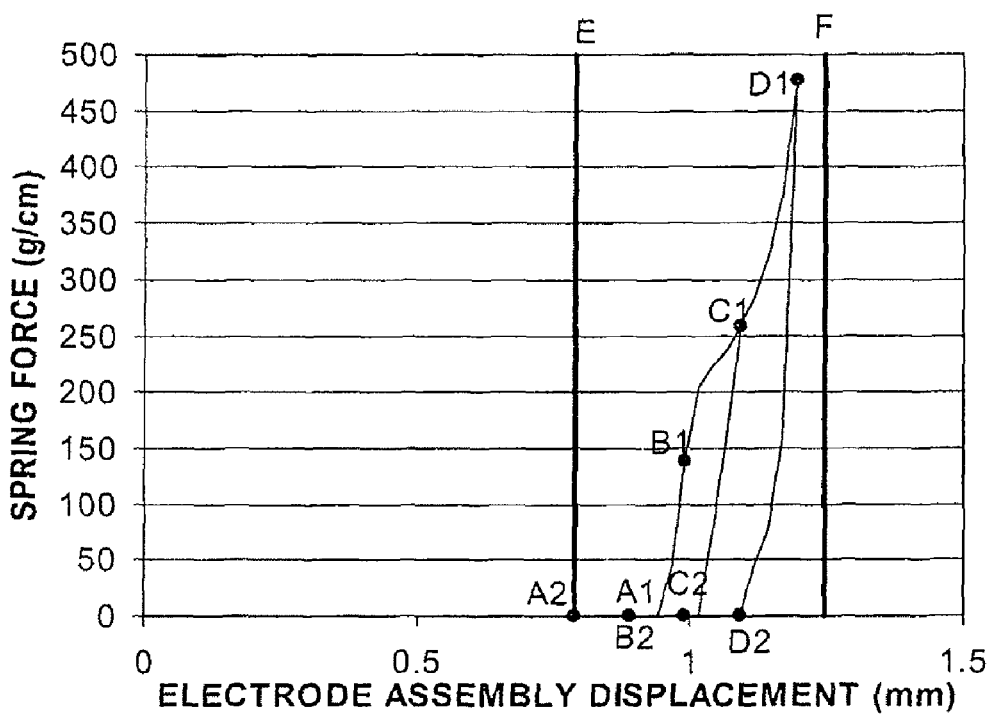
FIG. 12 is a graph, generated by a computer model, spring force as a function of electrode assembly displacement, for a 0.051 mm thick by 3.175 mm wide flat electrode lead.
Figure 13:
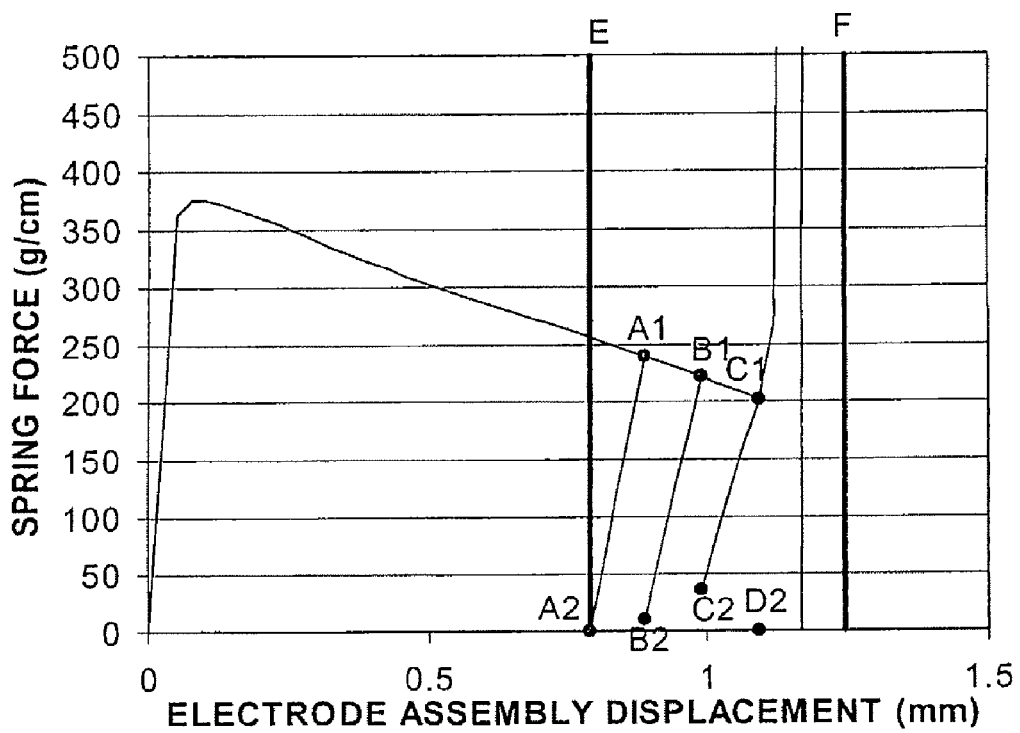
FIG. 13 is a graph, generated by a computer model, showing spring force as a function of electrode assembly displacement, for a V-shaped electrode lead with a leg angle of 90 degrees made from a strip of 0.051 mm wide thick by 3.175 mm wide metal strip.
Figure 14:
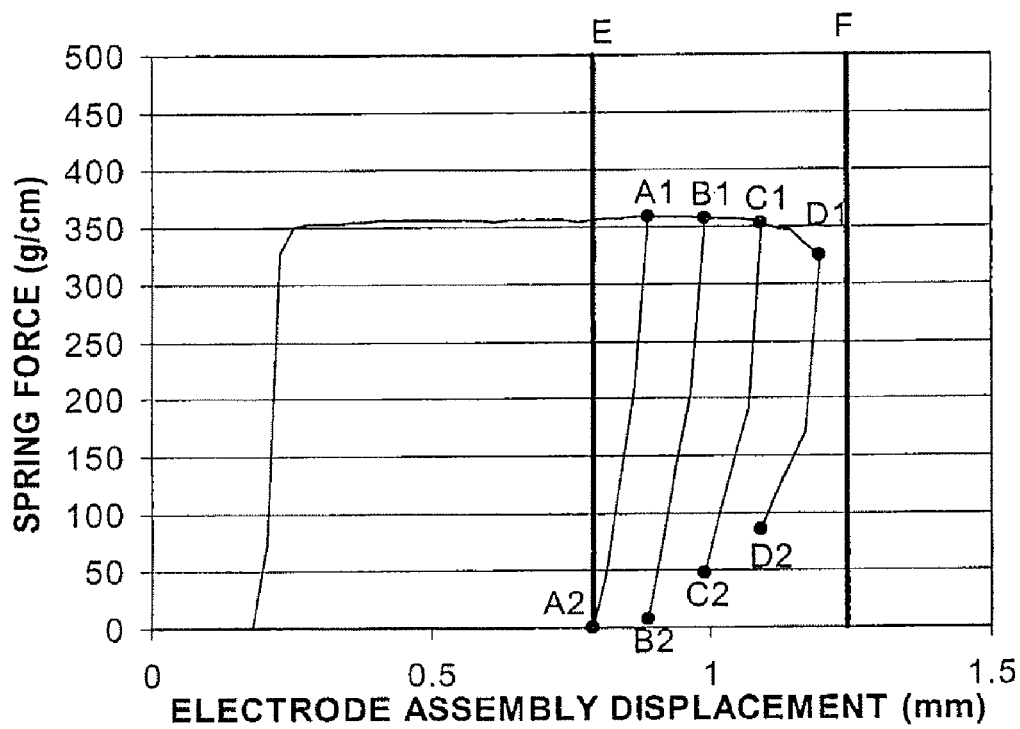
FIG. 14 is a graph, generated by a computer model, showing spring force as a function of electrode assembly displacement, for an arc-shaped electrode lead with an arc radius of 1.40 mm made from a strip of 0.051 mm thick by 3.175 mm wide metal strip.

The trends shown for FR03 cells in FIGS. 12, 13 and 14 are similar to those shown in FIGS. 7-11. Too much compression of the V-shaped lead can result in fatigue of the lead and loss of spring force. The minimum electrode diameter that can be used with the flat electrode lead represented in FIG. 12 is about 9.40 mm (0.370 inch), the minimum with the 1.40 mm radius arc-shaped lead represented in FIG. 14 is about 8.64 mm (0.340 inch), and the minimum with the 90 degree V-shaped lead represented in FIG. 13 is about 8.46 mm (0.333 inch).

Example 2

Ten lots of FR6 cells, similar to cell 10 in FIGS. 1 and 2, were made to evaluate cell characteristics and performance.

Each cell in Lots 1 and 2 had a 0.0254 mm (0.001 inch) thick strip of polyethylene film wrapped around the electrode assembly circumference. The average electrode assembly outside diameter (including the strip of polyethylene film was 13.06 mm (0.514 inch). Each cell in Lots 3-10 had no outer wrap of polyethylene film, and the average outside diameter of the electrode assembly was 12.95 mm (0.510 inch). In all lots the average inside diameter of the can was 13.41 mm (0.528 inch). In all lots the negative electrode lead was made from a thin strip of conductive metal 4.75 mm (0.187 inch) wide, cut to a length of 55.9 mm (2.20 inch). One end of the lead was attached to the lithium negative electrode near its outer end, so that the terminal end of the lead protruded from the bottom end of the assembled electrode assembly, where it was bent outward and then upward so the terminal portion of the lead was parallel to the longitudinal axis and adjacent to the external side surface of the electrode assembly, as shown in FIG. 2.

The negative electrode leads were different in each of the lots, as shown in Table 2. The non-planar leads had either a single V- or arc-shaped groove that was parallel to the longitudinal axis of the electrode assembly when the terminal end was bent along the side of the electrode assembly. The V leg angles, arc lengths and arc radii shown in Table 2 were dimensions of tooling used to make the shapes, and there was some deviation and variability in the actual formed leads. The grooves were approximately 12.7 mm (0.50 inch) long, extending from the terminal ends of the leads, with a transition zone from the V- or arc-shaped section to a planar section.

Sample cells from each lot were tested for open circuit voltage, AC impedance and amperage before and after storage for 60 days at 60° C. Sample cells from each lot were also tested on a variety of discharge, physical abuse and electrical abuse tests. There were no substantial differences, beyond expected variability, among the lots.

TABLE 2

| Lot | Lead Material | Lead Shape |
|---|---|---|
| 1 | Nickel plated cold rolled steel, 0.051 mm (0.002 inch) thick | flat |
| 2 | Nickel plated cold rolled steel, 0.051 mm (0.002 inch) thick | V-shaped groove, 90 degree leg angle |
| 3 | Nickel plated cold rolled steel, 0.051 mm (0.002 inch) thick | arc-shaped groove, 90° arc, 1.91 mm (0.075 inch) radius |
| 4 | Nickel, 0.076 mm (0.003 inch) thick | V-shaped groove, 90 degree leg angle |
| 5 | Nickel, 0.076 mm (0.003 inch) thick | arc-shaped groove, 90° arc, 1.91 mm (0.075 inch) radius |
| 6 | Nickel plated cold rolled steel, 0.051 mm (0.002 inch) thick | flat |
| 7 | Nickel plated cold rolled steel, 0.051 mm (0.002 inch) thick | V-shaped groove, 73 degree leg angle |
| 8 | Nickel plated cold rolled steel, 0.051 mm (0.002 inch) thick | arc-shaped groove, 90° arc, 1.50 mm (0.059 inch) radius |
| 9 | Copper-nickel alloy (Olin Brass Alloy 7025), 0.051 mm (0.002 inch) thick | V-shaped groove, 73 degree leg angle |
| 10 | Copper-nickel alloy (Olin Brass Alloy 7025), 0.051 mm (0.002 inch) thick | arc-shaped groove, 90° arc, 1.50 mm (0.059 inch) radius |

Example 3

Eight lots of FR6 cells, similar to cell 10 shown in FIGS. 1 and 2, were constructed to determine average service life of the cells. The cells of each lot had an interfacial, theoretical A/C input capacity ratio of 0.92.

Each of the Control Lot 1 and Lots 11-14 were identical with exception to the negative electrode lead as explained hereinbelow. The negative electrode consisted of lithium alloy foil having an aluminum content of about 0.5 weight %. Cells of Control Lot 1 included a nickel plated cold rolled steel negative electrode lead welded to 96% of the width of the lithium foil and had an overall length of 55.80 mm (2.200 inches). Cells of Lot 11 had an anode lead directly connected to 50% of the width of the lithium foil and an overall length of 37.97 mm (1.495 inches). Cells of Lot 12 had a nickel plated cold rolled steel negative electrode lead that extended 25% of the width of the lithium foil and an overall length of 28.22 mm (1.111 inches). Cells of Lot 13 had a copper alloy 7025 negative electrode lead with a length that extended 96% of the width of the lithium foil and an overall length of 55.80 mm (2.200 inches). Cells of Lot 14 had a copper alloy 7025 negative electrode lead that extended 50% of the width of the lithium foil and an overall length of 37.97 mm (1.495 inches).

Cells of Control Lot 2 and Lots 15 and 16 were identical except for the negative electrode lead as follows. The cells of Control Lot 2 and Lots 15 and 16 were formed including a negative electrode consisting of a lithium alloy foil having an aluminum content of about 0.5 wt. %. The positive electrode was formed as a patterned electrode with the electrochemically active material mixture selectively deposited on either side of a positive electrode current collector. The cells of Control Lot 2 included a nickel plated cold rolled steel negative electrode lead welded to 96% of the width of the lithium foil and had an overall length of 55.80 mm (2.20 inches). Cells of Lot 15 included a nickel plated cold rolled steel negative electrode lead that extended 50% of the width of the lithium foil and had an overall length of 37.97 mm (1.495 inches). Cells of Lot 16 utilized a copper alloy 7025 negative electrode lead that extended 16% of the width of the lithium foil and had an overall length of 25.32 mm (0.997 inch).

The surface area of the negative electrode lead in contact with the lithium foil negative electrode was 177.6 mm$^2$ for the cells having leads extending 96% of the lithium, 92.6 mm$^2$ for the cells extending 50% of the lithium width, 46.3 mm$^2$ for the cells extending 25% of the lithium width, and 29.6 mm$^2$ for the cells extending 16% of the lithium width.

The negative electrode lead in each lot was pressure welded via light contact to the negative lithium foil by pressure bonding. In all Lots, the negative electrode lead was attached to the lithium foil negative electrode near its outer length end and 2.2 mm from the length end, so that the terminal end of the lead protruded from the bottom end of the assembled jellyroll electrode assembly, where it was bent outward and then upwards so the terminal portion of the lead was substantially parallel to the longitudinal axis and adjacent the external side surface of the electrode assembly. The outer circumference of the wound electrode assembly was covered with by the cell separator. One or more portions of the lead not connected to the lithium negative electrode were in contact pressure with the container of the cell.

The control and example cells for the indicated lots were tested for service life according to the tests set forth in Tables 3 and 4. The results listed in the Tables represent corrected input variability. For the continuous test, the cells were discharged continuously at the rate given to the indicated voltage cutoff. The DSC test is considered a "high rate" test and is indicative of cell performance for high rate uses such as in devices, for example a digital camera. The DSC test cycles the electrochemical cell utilizing two pulses, the first pulse at 1500 mW for 2 seconds followed by the second pulse at 650 mW for 28 seconds. The pulse sequence is repeated 10 times, followed by a rest period for 55 minutes. Afterwards, the pulse sequence and rest period are repeated to a predetermined cut-off voltage, 1.05 volts for the test performed herein.

TABLE 3

| TEST | | Control 1<br>2.200" NiCRS<br>96% Li width | Lot 11<br>1.495" NiCRS<br>50% Li width | Lot 12<br>1.111" NiCRS<br>25% Li width | Lot 13<br>2.200" Cu 7025<br>96% Li width | Lot 14<br>1.495" Cu<br>50% Li width |
|---|---|---|---|---|---|---|
| 500 mW Cont. | % Control | 100.0% | 100.5% | 100.6% | 99.6% | 98.6% |
| 1.0 V cut | sd | 0.8% | 0.4% | 0.1% | 0.7% | 0.4% |
| 1000 mA Cont. | % Control | 100.0% | 99.7% | 99.2% | 98.3% | 97.2% |
| 1.0 V cut | sd | 0.9% | 0.7% | 0.1% | 1.3% | 0.1% |
| 1000 mW Cont. | % Control | 100.0% | 100.1% | 98.4% | 99.3% | 99.7% |
| 1.0 V cut | sd | 0.6% | 1.1% | 0.1% | 1.6% | 0.1% |
| 1500 mA Cont. | % Control | 100.0% | 100.2% | 99.8% | 97.6% | 98.5% |
| 1.0 V cut | sd | 1.4% | 2.3% | 0.1% | 2.5% | 0.1% |
| 1500 mW Cont. | % Control | 100.0% | 101.6% | 98.5% | 94.7% | 100.0% |
| 1.0 V cut | sd | 1.7% | 0.9% | 0.1% | 1.4% | 0.2% |
| 2000 mA Cont. | % Control | 100.0% | 100.4% | 98.0% | 96.0% | 98.4% |
| 1.0 V cut | sd | 2.1% | 1.2% | 0.0% | 0.8% | 0.1% |
| 1500 mW DSC @ | % Control | 100.0% | 101.1% | 100.5% | 99.6% | 98.9% |
| RT 1.05 V cut | sd | 1.2% | 1.3% | 0.1% | 0.7% | 0.1% |

TABLE 4

| TEST | | Control 2<br>2.200" NiCRS<br>(96% Li width) | Lot 15<br>1.495" NiCRS<br>(50% Li width) | Lot 16<br>0.997" Cu 7025<br>(16% Li width) |
|---|---|---|---|---|
| 1000 mA Continuous | % Control | 100.0% | 101.0% | 100.7% |
| 1.0 V | sd | 1.0% | 1.4% | 0.7% |
| 1000 mW Continuous | % Control | 100.0% | 99.9% | 100.6% |
| 1.0 V | sd | 1.2% | 0.6% | 0.6% |
| 1500 mA Continuous | % Control | 100.0% | 102.1% | 101.9% |
| 1.0 V | sd | 1.3% | 0.7% | 0.9% |
| 1500 mW Continuous | % Control | 100.0% | 99.5% | 100.6% |
| 1.0 V | sd | 1.5% | 0.8% | 1.0% |
| 2000 mA Continuous | % Control | 100.0% | 101.8% | 102.4% |
| 1.0 V | sd | 1.1% | 1.5% | 1.5% |
| 2000 mW Cont. | % Control | 100.0% | 103.3% | 105.2% |
| 1.0 V cut | sd | 0.9% | 1.4% | 2.1% |
| 1500 mW DSC at RT | % Control | 100.0% | 101.5% | 101.2% |
| 1.05 V | sd | 1.4% | 2.0% | 1.4% |

As illustrated in Tables 3 and 4, it was unexpectedly discovered that a negative electrode lead connected to less than 96% of the width of a lithium-containing negative electrode, which is free of a separate current collector, has little impact on cell service, when compared to the Lots of prior art control cells. Differences in the results are believed to be due to minor variations that can occur during manufacturing and variations in natural materials utilized in the cells. Unexpectedly, the lithium of the negative electrode did not become too isolated when utilizing a shortened negative electrode lead. Moreover, the results indicate that shortened negative electrode leads can be utilized with different types of cell constructions without substantially affecting cell service life.

It will be understood by those who practice the invention and those skilled in the art that various modifications and improvements may be made to the invention without departing from the spirit of the disclosed concepts. The scope of protection afforded is to be determined by the claims and by the breadth of interpretation allowed by law.

What is claimed is:

1. An electrochemical cell, comprising:
a substantially round, cylindrical container comprising a conductive material, said container having: a closed end with a negative terminal, an open end sealed by an end assembly that is electrically insulated from the container and has a positive terminal and a sidewall extending between the closed end and the open end;
a nonaqueous, organic electrolyte;
a jellyroll electrode assembly comprising a positive electrode, a separator and a negative electrode consisting essentially of lithium or a lithium alloy of at least 90 wt. % lithium and having a length, a width and a cumulative surface area;
an internal lead connected to less than 0.7% of the cumulative surface area of the negative electrode at an edge of the negative electrode that is proximate to the closed end of the container;
wherein the lead extends a distance across the negative electrode measured along a longitudinal axis of the electrode assembly from the edge of the negative electrode that is greater than 10% and less than 88% of the width of the negative electrode;
wherein a portion of the lead is folded and extends upward to make electrical contact with the container sidewall by pressure only, said portion of the lead having an integrally formed groove to bias the lead against the sidewall; and
wherein the maximum difference between the container inside diameter and the electrode assembly diameter is defined by one equation selected from the group consisting of:

i) $2R \cdot (1 - \cos(W/(2R))) + \dfrac{ID - \sqrt{ID^2(2R\sin(W/(2R)))}^2}{2} + t,$ wherein W is the width of the lead measured along a surface of the lead, t is the material thickness of the lead, R is the radius of an arc formed between two longitudinal edges of the lead, ID is the inside diameter of the container, and $(W/R) \leqq \pi r$; and ii) $\left(\dfrac{W}{2}\right) \cdot \sin\left(\dfrac{180-\theta}{2}\right) + \left(\dfrac{ID - \sqrt{ID^2 - (W^2/2) \cdot (1-\cos\theta)}}{2}\right) + t,$ wherein W is the width of the lead measured along a surface of the lead, t is the material thickness of the lead, θ is an angle between 0 and 180 degrees defined by two longitudinal edges of the lead, and ID is the inside diameter of the can.

2. An electrochemical cell according to claim 1, wherein the groove has a shape selected from the group consisting of: a V-shape, an arc and a combination thereof.

3. An electrochemical cell according to claim 2, wherein the groove is disposed substantially parallel to a longitudinal axis of the jellyroll electrode assembly.

4. An electrochemical cell, comprising:
a substantially round, cylindrical container comprising a conductive material having a closed end with a negative terminal, an open end sealed by an end assembly electrically insulated from the container and having a positive terminal, and a sidewall extending between the closed end and the open end;
a nonaqueous, organic electrolyte;
a jellyroll electrode assembly comprising a positive electrode, a separator and a negative electrode consisting essentially of lithium or a lithium alloy of at least 90 wt. % lithium and having a length, a width and a cumulative surface area; and
an internal lead oriented along a longitudinal axis of the jellyroll electrode assembly and folded so that a first terminal end of the lead is connected to the negative electrode and a second terminal end of the lead makes electrical contact with the container sidewall by pressure only; and
wherein a portion of the lead has a groove to bias the lead against the sidewall; and
wherein the maximum difference between the container inside diameter and the electrode assembly diameter is defined by one equation selected from the group consisting of:

i) $2R \cdot (1 - \cos(W/(2R))) + \dfrac{ID - \sqrt{ID^2 - (2R\sin(W/(2R)))^2}}{2} + t,$ wherein W is the width of the lead measured along a surface of the lead, t is the material thickness of the lead, R is the radius of an arc formed between two longitudinal edges of the lead, ID is the inside diameter of the container, and $(W/R) \leqq \pi r$; and ii) $\left(\dfrac{W}{2}\right) \cdot \sin\left(\dfrac{180-\theta}{2}\right) + \left(\dfrac{ID - \sqrt{ID^2 - (W^2/2) \cdot (1-\cos\theta)}}{2}\right) + t,$ wherein W is the width of the lead measured along a surface of the lead, t is the material thickness of the lead, θ is an angle between 0 and 180 degrees defined by two longitudinal edges of the lead, and ID is the inside diameter of the can.

5. An electrochemical cell according to claim 4, wherein the groove has a shape selected from the group consisting of: a V-shape, an arc and a combination thereof.

6. An electrochemical cell according to claim 4, wherein the groove is disposed substantially parallel to a longitudinal axis of the jellyroll electrode assembly.

7. An electrochemical cell according to claim 4, wherein the internal lead connected to the negative electrode at an edge of the negative electrode that is proximate to the closed end of the container.

8. An electrochemical cell according to claim 4, wherein the internal lead is connected to less than 0.7% of the cumulative surface area of the negative electrode.

9. An electrochemical cell according to claim 8, wherein the internal lead is connected to at an edge of the negative electrode that is proximate to the closed end of the container.

10. The electrochemical cell according to claim 8, wherein the surface area is connected to 0.02% to 0.5% of the cumulative surface area.

11. The electrochemical cell according to claim 8, wherein the lead has an area of 5.0 mm² to less than 160 mm² in contact with the surface of the negative electrode and wherein the lead is nickel plated cold rolled steel, nickel, a nickel alloy, copper, a copper alloy, or stainless steel.

12. The electrochemical cell according to claim 11, wherein the lead has an area from 10.0 mm² to 92.6 mm² in contact with the surface of the negative electrode.

13. An electrochemical cell according to claim 4, wherein the internal lead is connected to the negative electrode at an edge of the negative electrode that is proximate to the closed end of the container and extends a distance across the negative electrode measured along a longitudinal axis of the electrode assembly from the edge of the negative electrode that is greater than 10% and less than 88% of the width of the negative electrode.

14. The electrochemical cell according to claim 13, wherein the distance is between 10% to 60% of the width of the negative electrode.

15. The electrochemical cell according to claim 13, wherein the distance is between 10% to 50% of the width of the negative electrode.

16. The electrochemical cell according to claim 4, wherein there is no direct electrical contact between the sidewall of the container and either the negative electrode or the positive electrode contact.

* * * * *